US012537011B2

(12) United States Patent
Fuchs et al.

(10) Patent No.: US 12,537,011 B2
(45) **Date of Patent: *Jan. 27, 2026**

(54) AUDIO SCENE ENCODER, AUDIO SCENE DECODER AND RELATED METHODS USING HYBRID ENCODER-DECODER SPATIAL ANALYSIS

(71) Applicant: Fraunhofer-Gesellschaft zur Förderung der angewandten Forschung e.V., Munich (DE)

(72) Inventors: Guillaume Fuchs, Erlangen (DE); Stefan Bayer, Erlangen (DE); Markus Multrus, Erlangen (DE); Oliver Thiergart, Erlangen (DE); Alexandre Bouthéon, Erlangen (DE); Jürgen Herre, Erlangen (DE); Florin Ghido, Erlangen (DE); Wolfgang Jaegers, Forchheim (DE); Fabian Küch, Erlangen (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 255 days.

This patent is subject to a terminal disclaimer.

(21) Appl. No.: 18/330,953

(22) Filed: Jun. 7, 2023

(65) Prior Publication Data

US 2023/0317088 A1 Oct. 5, 2023

Related U.S. Application Data

(63) Continuation of application No. 17/645,110, filed on Dec. 20, 2021, now Pat. No. 11,854,560, which is a (Continued)

(30) Foreign Application Priority Data

Feb. 1, 2018 (EP) .................................... 18154749
Jul. 26, 2018 (EP) .................................... 18185852

(51) Int. Cl.
*G10L 19/032* (2013.01)
*G10L 19/008* (2013.01)

(Continued)

(52) U.S. Cl.
CPC .......... *G10L 19/032* (2013.01); *G10L 19/008* (2013.01); *H04R 3/005* (2013.01);

(Continued)

(58) Field of Classification Search
CPC ..... G10L 19/032; G10L 19/008; G10L 19/18; G10L 19/02; H04R 3/005; H04R 3/04;

(Continued)

(56) References Cited

U.S. PATENT DOCUMENTS

| | | | |
|---|---|---|---|
| 8,428,958 | B2 | 4/2013 | Sung et al. |
| 2007/0019813 | A1 | 1/2007 | Hilpert et al. |

(Continued)

FOREIGN PATENT DOCUMENTS

| | | |
|---|---|---|
| CN | 107408389 | 11/2017 |
| JP | 2009501948 A | 1/2009 |

(Continued)

OTHER PUBLICATIONS

Notice of Allowance dated Feb. 16, 2022 issued in related U.S. Appl. No. 16/943,065.

(Continued)

*Primary Examiner* — Yogeshkumar Patel
(74) *Attorney, Agent, or Firm* — Haynes and Boone, LLP

(57) ABSTRACT

An audio scene encoder for encoding an audio scene, the audio scene having at least two component signals, has: a core encoder for core encoding the at least two component signals, wherein the core encoder is configured to generate a first encoded representation for a first portion of the at least two component signals, and to generate a second encoded representation for a second portion of the at least two (Continued)

component signals, a spatial analyzer for analyzing the audio scene to derive one or more spatial parameters or one or more spatial parameter sets for the second portion; and an output interface for forming the encoded audio scene signal, the encoded audio scene signal having the first encoded representation, the second encoded representation, and the one or more spatial parameters or one or more spatial parameter sets for the second portion.

22 Claims, 17 Drawing Sheets

Related U.S. Application Data continuation of application No. 16/943,065, filed on Jul. 30, 2020, now Pat. No. 11,361,778, which is a continuation of application No. PCT/EP2019/052428, filed on Jan. 31, 2019.

(51) Int. Cl.
*H04R 3/00* (2006.01)
*H04R 3/04* (2006.01)
*H04R 3/12* (2006.01)
*H04R 5/04* (2006.01)
*H04S 7/00* (2006.01)

(52) U.S. Cl.
CPC ................. *H04R 3/04* (2013.01); *H04R 3/12* (2013.01); *H04R 5/04* (2013.01); *H04S 7/307* (2013.01); *H04S 2420/11* (2013.01)

(58) Field of Classification Search
CPC .. H04R 3/12; H04R 5/04; H04S 7/307; H04S 2420/11
See application file for complete search history.

(56) References Cited

U.S. PATENT DOCUMENTS

2011/0235810 A1* 9/2011 Neusinger ............... G10L 19/26 381/23
2012/0155653 A1* 6/2012 Jax ........................ G10L 19/008 381/23
2014/0358567 A1 12/2014 Koppens et al.
2015/0071446 A1* 3/2015 Sun ........................... H04S 5/00 381/17
2015/0213806 A1* 7/2015 Disch .................... G10L 19/008 704/500
2015/0221319 A1 8/2015 Cartwright et al.
2015/0356978 A1* 12/2015 Dickins ............... G10L 19/0208 704/226
2017/0164131 A1 6/2017 Krueger et al.
2017/0365263 A1 12/2017 Disch et al.
2017/0365264 A1 12/2017 Disch et al.
2019/0230436 A1* 7/2019 Tsingos .................. H04R 1/406

FOREIGN PATENT DOCUMENTS

JP 2009501957 A 1/2009
JP 2013524267 A 6/2013
JP 2015509212 A 3/2015
JP 2016-510569 A 4/2016
JP 2016519786 A 7/2016
JP 2017526004 A 9/2017
KR 10-2012-0006010 1/2012
RU 2495503 C2 9/2012
TW 201528252 7/2014
TW 201642673 12/2016
TW 201729180 8/2017
TW 201743568 12/2017
WO WO 2010/036061 A2 4/2010

OTHER PUBLICATIONS

Office Action dated Sep. 2, 2022 issued in the parallel Korean patent application No. 10-2020-7025235 (19 pages).
Johannes Boehm, et al., RMO-HOA Working Draft Text, ISO/IEC JTC1/SC29/WG11 MPEG2012/M31408, Oct. 23, 2013 (76 pages).
Office Action mailed Jul. 2, 2024 in parallel Japanese patent application No. 2023-063771 (8 pages).
Office Action dated Apr. 23, 2023 issued in the parallel Chinese application No. 201980024782.3 (7 pages).
Office Action dated Aug. 6, 2020 issued in the parallel TW patent application No. 108103887 (6 pages).
Ville Pulkki. "Virtual source positioning using vector base amplitude panning". J. Audio Eng. Soc., 45(6):456{466, Jun. 1997.
V. Pulkki, "Directional audio coding—perception-based reproduction of spatial sound", International Workshop on the Principles and Application on Spatial Hearing, Nov. 2009.
Office Action dated Nov. 9, 2020 issued in the parallel Russian patent application No. 2020128592 (16 pages).

* cited by examiner portions: $F_1$ … $F_4$ time frames (e.g. overlapping) with different resolutions, or one frame without parameters another frame with parameters portions are bands B1, B2, …, B6, …
different resolutions or one set of bands with parameters
and another set of bands without parameters

- selection of 2nd portion before or after spatial analysis and controlled by mode controller or fixed
- spatial analyzer relies on analysis filterbank of encoder or uses a separate filter bank (FREQUENCY DOMAIN ENCODER)

(TIME DOMAIN ENCODER )

(FREQUENCY DOMAIN ENCODER )

(TIME DOMAIN ENCODER )

(SPATIAL RENDERER)

AUDIO SCENE ENCODER, AUDIO SCENE DECODER AND RELATED METHODS USING HYBRID ENCODER-DECODER SPATIAL ANALYSIS

CROSS-REFERENCE TO RELATED APPLICATIONS

This application is a continuation of copending U.S. patent application Ser. No. 17/645,110 filed Dec. 20, 2021 which is a continuation of U.S. Pat. No. 11,361,778 issued Jun. 14, 2022 which is a continuation of International Application No. PCT/EP2019/052428, filed Jan. 31, 2019, which is incorporated herein by reference in its entirety, and additionally claims priority from European Application No. 18154749.8, filed Feb. 1, 2018, and from European Application No. 18185852.3, filed Jul. 26, 2018, which are also incorporated herein by reference in their entirety.

BACKGROUND OF THE INVENTION

The present invention is related to audio encoding or decoding and particularly to hybrid encoder/decoder parametric spatial audio coding.

Transmitting an audio scene in three dimensions entails handling multiple channels which usually engenders a large amount of data to transmit. Moreover 3D sound can be represented in different ways: traditional channel-based sound where each transmission channel is associated with a loudspeaker position; sound carried through audio objects, which may be positioned in three dimensions independently of loudspeaker positions; and scene-based (or Ambisonics), where the audio scene is represented by a set of coefficient signals that are the linear weights of spatial orthogonal spherical harmonics basis functions. In contrast to channel-based representation, scene-based representation is independent of a specific loudspeaker set-up, and can be reproduced on any loudspeaker set-ups at the expense of an extra rendering process at the decoder.

For each of these formats, dedicated coding schemes were developed for efficiently storing or transmitting the audio signals at low bit-rates. For example, MPEG surround is a parametric coding scheme for channel-based surround sound, while MPEG Spatial Audio Object Coding (SAOC) is a parametric coding method dedicated to object-based audio. A parametric coding technique for high order of Ambisonics was also provided in the recent standard MPEG-H phase 2.

In this transmission scenario, spatial parameters for the full signal are part of the coded and transmitted signal, i.e. estimated and coded in the encoder based on the fully available 3D sound scene and decoded and used for the reconstruction of the audio scene in the decoder. Rate constraints for the transmission typically limit the time and frequency resolution of the transmitted parameters which can be lower than the time-frequency resolution of the transmitted audio data.

Another possibility to create a three-dimensional audio scene is to upmix a lower dimensional representation, e.g. a two channel stereo or a first order Ambisonics representation, to the desired dimensionality using cues and parameters directly estimated from the lower-dimensional representation. In this case the time-frequency resolution can be chosen as fine as desired. On the other hand the used lower-dimensional and possibly coded representation of the audio scene leads to sub-optimal estimation of the spatial cues and parameters. Especially if the audio scene analyzed was coded and transmitted using parametric and semi-parametric audio coding tools the spatial cues of the original signal are disturbed more than only the lower-dimensional representation would cause.

Low rate audio coding using parametric coding tools has shown recent advances. Such advances of coding audio signals with very low bit rates led to the extensive use of so called parametric coding tools to ensure good quality. While a wave-form-preserving coding, i.e., a coding where only quantization noise is added to the decoded audio signal, is of advantage, e.g. using a time-frequency transform based coding and shaping of the quantization noise using a perceptual model like MPEG-2 AAC or MPEG-1 MP3, this leads to audible quantization noise particularly for low bit rates.

To overcome this problem parametric coding tools where developed, where parts of the signal are not coded directly, but regenerated in the decoder using a parametric description of the desired audio signals, where the parametric description needs less transmission rate than the wave-form-preserving coding. These methods do not try to retain the wave form of the signal but generate an audio signal that is perceptually equal to the original signal. Examples for such parametric coding tools are band width extensions like Spectral Band Replication (SBR), where high band parts of a spectral representation of the decoded signal are generated by copying wave form coded low band spectral signal portions and adaptation according to said parameters. Another method is Intelligent Gap Filling (IGF), where some bands in the spectral representation are coded directly, while the bands quantized to zero in the encoder are replaced by already decoded other bands of the spectrum that are again chosen and adjusted according to transmitted parameters. A third used parametric coding tools is noise filling, where parts of the signal or spectrum are quantized to zero and are filled with random noise and adjusted according to the transmitted parameters.

Recent audio coding standards used for coding at medium to low bit rates use a mixture of such parametric tools to get high perceptual quality for those bit rates. Examples for such standards are xHE-AAC, MPEG4-H and EVS.

DirAC spatial parameter estimation and blind upmix is a further procedure. DirAC is a perceptually motivated spatial sound reproduction. It is assumed, that at one time instant and at one critical band, the spatial resolution of the auditory system is limited to decoding one cue for direction and another for inter-aural coherence or diffuseness.

Based on these assumptions, DirAC represents the spatial sound in one frequency band by cross-fading two streams: a non-directional diffuse stream and a directional non-diffuse stream. The DirAC processing is performed in two phases: the analysis and the synthesis as pictured in FIGS. 5A and 5B.

In the DirAC analysis stage shown in FIG. 5A, a first-order coincident microphone in B-format is considered as input and the diffuseness and direction of arrival of the sound is analyzed in frequency domain. In the DirAC synthesis stage shown in FIG. 5B, sound is divided into two streams, the non-diffuse stream and the diffuse stream. The non-diffuse stream is reproduced as point sources using amplitude panning, which can be done by using vector base amplitude panning (VBAP) [2]. The diffuse stream is responsible of the sensation of envelopment and is produced by conveying to the loudspeakers mutually decorrelated signals.

The analysis stage in FIG. 5A comprises a band filter 1000, an energy estimator 1001, an intensity estimator 1002, temporal averaging elements 999*a* and 999*b*, a diffuseness calculator 1003 and a direction calculator 1004. The calculated spatial parameters are a diffuseness value between 0 and 1 for each time/frequency tile and a direction of arrival parameter for each time/frequency tile generated by block 1004. In FIG. 5A, the direction parameter comprises an azimuth angle and an elevation angle indicating the direction of arrival of a sound with respect to the reference or listening position and, particularly, with respect to the position, where the microphone is located, from which the four component signals input into the band filter 1000 are collected. These component signals are, in the FIG. 5A illustration, first order Ambisonics components which comprises an omnidirectional component W, a directional component X, another directional component Y and a further directional component Z.

The DirAC synthesis stage illustrated in FIG. 5B comprises a band filter 1005 for generating a time/frequency representation of the B-format microphone signals W, X, Y, Z. The corresponding signals for the individual time/frequency tiles are input into a virtual microphone stage 1006 that generates, for each channel, a virtual microphone signal. Particularly, for generating the virtual microphone signal, for example, for the center channel, a virtual microphone is directed in the direction of the center channel and the resulting signal is the corresponding component signal for the center channel. The signal is then processed via a direct signal branch 1015 and a diffuse signal branch 1014. Both branches comprise corresponding gain adjusters or amplifiers that are controlled by diffuseness values derived from the original diffuseness parameter in blocks 1007, 1008 and furthermore processed in blocks 1009, 1010 in order to obtain a certain microphone compensation.

The component signal in the direct signal branch 1015 is also gain-adjusted using a gain parameter derived from the direction parameter consisting of an azimuth angle and an elevation angle. Particularly, these angles are input into a VBAP (vector base amplitude panning) gain table 1011. The result is input into a loudspeaker gain averaging stage 1012, for each channel, and a further normalizer 1013 and the resulting gain parameter is then forwarded to the amplifier or gain adjuster in the direct signal branch 1015. The diffuse signal generated at the output of a decorrelator 1016 and the direct signal or non-diffuse stream are combined in a combiner 1017 and, then, the other subbands are added in another combiner 1018 which can, for example, be a synthesis filter bank. Thus, a loudspeaker signal for a certain loudspeaker is generated and the same procedure is performed for the other channels for the other loudspeakers 1019 in a certain loudspeaker setup.

The high-quality version of DirAC synthesis is illustrated in FIG. 5B, where the synthesizer receives all B-format signals, from which a virtual microphone signal is computed for each loudspeaker direction. The utilized directional pattern is typically a dipole. The virtual microphone signals are then modified in non-linear fashion depending on the metadata as discussed with respect to the branches 1016 and 1015. The low-bit-rate version of DirAC is not shown in FIG. 5B. However, in this low-bit-rate version, only a single channel of audio is transmitted. The difference in processing is that all virtual microphone signals would be replaced by this single channel of audio received. The virtual microphone signals are divided into two streams, the diffuse and non-diffuse streams, which are processed separately. The non-diffuse sound is reproduced as point sources by using vector base amplitude panning (VBAP). In panning, a monophonic sound signal is applied to a subset of loudspeakers after multiplication with loudspeaker-specific gain factors. The gain factors are computed using the information of loudspeakers setup and specified panning direction. In the low-bit-rate version, the input signal is simply panned to the directions implied by the metadata. In the high-quality version, each virtual microphone signal is multiplied with the corresponding gain factor, which produces the same effect with panning, however, it is less prone to any non-linear artifacts.

The aim of the synthesis of the diffuse sound is to create perception of sound that surrounds the listener. In the low-bit-rate version, the diffuse stream is reproduced by decorrelating the input signal and reproducing it from every loudspeaker. In the high-quality version, the virtual microphone signals of the diffuse streams are already incoherent in some degree, and they need to be decorrelated only mildly.

The DirAC parameters also called spatial metadata consist of tuples of diffuseness and direction, which in spherical coordinate is represented by two angles, the azimuth and the elevation. If both analysis and synthesis stage are run at the decoder side the time-frequency resolution of the DirAC parameters can be chosen to be the same as the filter bank used for the DirAC analysis and synthesis, i.e. a distinct parameter set for every time slot and frequency bin of the filter bank representation of the audio signal.

The problem of performing the analysis in a spatial audio coding system only on the decoder side is that for medium to low bit rates parametric tools like described in the previous section are used. Since the non-wave-form preserving nature of those tools, the spatial analysis for spectral portions where mainly parametric coding is used can lead to vastly different values for the spatial parameters than an analysis of the original signal would have produced. FIGS. 2A and 2B show such a misestimation scenario where a DirAC analysis was performed on an uncoded signal (a) and a B-Format coded and transmitted signal with a low bit rate (b) with a coder using partly wave-form-preserving and partly parametric coding. Especially, with respect to the diffuseness, large differences can be observed.

Recently, a spatial audio coding method using DirAC analysis in the encoder and transmitting the coded spatial parameters in the decoder was disclosed in [3][4]. FIG. 3 illustrates a system overview of an encoder and a decoder combining DirAC spatial sound processing with an audio coder. An input signal such as a multi-channel input signal, a first order Ambisonics (FOA) or a high order Ambisonics (HOA) signal or an object-encoded signal comprising of one or more transport signals comprising a downmix of objects and corresponding object metadata such as energy metadata and/or correlation data are input into a format converter and combiner 900. The format converter and combiner is configured to convert each of the input signals into a corresponding B-format signal and the format converter and combiner 900 additionally combines streams received in different representations by adding the corresponding B-format components together or by other combining technologies consisting of a weighted addition or a selection of different information of the different input data.

The resulting B-format signal is introduced into a DirAC analyzer 210 in order to derive DirAC metadata such as direction of arrival metadata and diffuseness metadata, and the obtained signals are encoded using a spatial metadata encoder 220. Moreover, the B-format signal is forwarded to a beam former/signal selector in order to downmix the B-format signals into a transport channel or several transport channels that are then encoded using an EVS based core encoder 140.

The output of block 220 on the one hand and block 140 on the other hand represent an encoded audio scene. The encoded audio scene is forwarded to a decoder, and in the decoder, a spatial metadata decoder 700 receives the encoded spatial metadata and an EVS-based core decoder 500 receives the encoded transport channels. The decoded spatial metadata obtained by block 700 is forwarded to a DirAC synthesis stage 800 and the decoded one or more transport channels at the output of block 500 are subjected to a frequency analysis in block 860. The resulting time/frequency decomposition is also forwarded to the DirAC synthesizer 800 that then generates, for example, as a decoded audio scene, loudspeaker signals or first order Ambisonics or higher order Ambisonics components or any other representation of an audio scene.

In the procedure disclosed in [3] and [4], the DirAC metadata, i.e., the spatial parameters, are estimated and coded at a low bitrate and transmitted to the decoder, where they are used to reconstruct the 3D audio scene together with a lower dimensional representation of the audio signal.

In this invention, the DirAC metadata, i.e. the spatial parameters, are estimated and coded at a low bit rate and transmitted to the decoder where they are used to reconstruct the 3D audio scene together with a lower dimensional representation of the audio signal.

To achieve the low bit rate for the metadata, the time-frequency resolution is smaller than the time-frequency resolution of the used filter bank in analysis and synthesis of the 3D audio scene. FIGS. 4A and 4B show a comparison between the uncoded and ungrouped spatial parameters of a DirAC analysis (a) and the coded and grouped parameters of the same signal using the DirAC spatial audio coding system disclosed in [3] with coded and transmitted DirAC metadata. In comparison to FIGS. 2A and 2B it can be observed that the parameters used in the decoder (b) are closer to the parameters estimated from the original signal, but that the time-frequency-resolution is lower than for the decoder-only estimation.

SUMMARY

According to an embodiment, an audio scene encoder for encoding an audio scene, the audio scene having at least two component signals, may have: a core encoder for core encoding the at least two component signals, wherein the core encoder is configured to generate a first encoded representation for a first portion of the at least two component signals, and to generate a second encoded representation for a second portion of the at least two component signals, wherein the core encoder is configured to form a time frame from the at least two component signals, wherein a first frequency subband of the time frame of the at least two component signals is the first portion of the at least two component signals and a second frequency subband of the time frame is the second portion of the at least two component signals, wherein the first frequency subband is separated from the second frequency subband by a predetermined border frequency, wherein the core encoder is configured to generate the first encoded representation for the first frequency subband having M component signals, and to generate the second encoded representation for the second frequency subband having N component signals, wherein M is greater than N, and wherein N is greater than or equal to 1; a spatial analyzer for analyzing the audio scene having the at least two component signals to derive one or more spatial parameters or one or more spatial parameter sets for the second frequency subband; and an output interface for forming an encoded audio scene signal, the encoded audio scene signal having the first encoded representation for the first frequency subband having the M component signals, the second encoded representation for the second frequency subband having the N component signals, and the one or more spatial parameters or one or more spatial parameter sets for the second frequency subband.

According to another embodiment, an audio scene decoder may have: an input interface for receiving an encoded audio scene signal having a first encoded representation of a first portion of at least two component signals, a second encoded representation of a second portion of the at least two component signals, and one or more spatial parameters for the second portion of the at least two component signals; a core decoder for decoding the first encoded representation and the second encoded representation to obtain a decoded representation of the at least two component signals representing an audio scene; a spatial analyzer for analyzing a portion of the decoded representation corresponding to the first portion of the at least two component signals to derive one or more spatial parameters for the first portion of the at least two component signals; and a spatial renderer for spatially rendering the decoded representation using the one or more spatial parameters for the first portion and the one or more spatial parameters for the second portion as included in the encoded audio scene signal.

According to another embodiment, a method of encoding an audio scene, the audio scene having at least two component signals, may have the steps of: core encoding the at least two component signals, wherein the core encoding has generating a first encoded representation for a first portion of the at least two component signals, and generating a second encoded representation for a second portion of the at least two component signals; wherein the core encoding has forming a time frame from the at least two component signals, wherein a first frequency subband of the time frame of the at least two component signals is the first portion of the at least two component signals and a second frequency subband of the time frame is the second portion of the at least two component signals, wherein the first frequency subband is separated from the second frequency subband by a predetermined border frequency, wherein the core encoding has generating the first encoded representation for the first frequency subband having M component signals, and generating the second encoded representation for the second frequency subband having N component signals, wherein M is greater than N, and wherein N is greater than or equal to 1; analyzing the audio scene having the at least two component signals to derive one or more spatial parameters or one or more spatial parameter sets for the second frequency subband; and forming the encoded audio scene signal, the encoded audio scene signal having the first encoded representation for the first frequency subband having the M component signals, the second encoded representation for the second frequency subband having the N component signals, and the one or more spatial parameters or the one or more spatial parameter sets for the second frequency subband.

According to still another embodiment, a method of decoding an audio scene may have the steps of: receiving an encoded audio scene signal having a first encoded representation of a first portion of at least two component signals, a second encoded representation of a second portion of the at least two component signals, and one or more spatial parameters for the second portion of the at least two component signals; decoding the first encoded representation and the second encoded representation to obtain a decoded representation of the at least two component signals representing the audio scene; analyzing a portion of the decoded representation corresponding to the first portion of the at least two component signals to derive one or more spatial parameters for the first portion of the at least two component signals; and spatially rendering the decoded representation using the one or more spatial parameters (840) for the first portion and the one or more spatial parameters for the second portion as included in the encoded audio scene signal.

Another embodiment may have a non-transitory digital storage medium having stored thereon a computer program for performing a method of encoding an audio scene, the audio scene having at least two component signals, the method having the steps of: core encoding the at least two component signals, wherein the core encoding has generating a first encoded representation for a first portion of the at least two component signals, and generating a second encoded representation for a second portion of the at least two component signals; wherein the core encoding has forming a time frame from the at least two component signals, wherein a first frequency subband of the time frame of the at least two component signals is the first portion of the at least two component signals and a second frequency subband of the time frame is the second portion of the at least two component signals, wherein the first frequency subband is separated from the second frequency subband by a predetermined border frequency, wherein the core encoding has generating the first encoded representation for the first frequency subband having M component signals, and generating the second encoded representation for the second frequency subband having N component signals, wherein M is greater than N, and wherein N is greater than or equal to 1; analyzing the audio scene having the at least two component signals to derive one or more spatial parameters or one or more spatial parameter sets for the second frequency subband; and forming the encoded audio scene signal, the encoded audio scene signal having the first encoded representation for the first frequency subband having the M component signals, the second encoded representation for the second frequency subband having the N component signals, and the one or more spatial parameters or the one or more spatial parameter sets for the second frequency subband, when said computer program is run by a computer.

Still another embodiment may have a non-transitory digital storage medium having stored thereon a computer program for performing a method of decoding an audio scene, having the steps of: receiving an encoded audio scene signal having a first encoded representation of a first portion of at least two component signals, a second encoded representation of a second portion of the at least two component signals, and one or more spatial parameters for the second portion of the at least two component signals; decoding the first encoded representation and the second encoded representation to obtain a decoded representation of the at least two component signals representing the audio scene; analyzing a portion of the decoded representation corresponding to the first portion of the at least two component signals to derive one or more spatial parameters for the first portion of the at least two component signals; and spatially rendering the decoded representation using the one or more spatial parameters (840) for the first portion and the one or more spatial parameters for the second portion as included in the encoded audio scene signal, when said computer program is run by a computer.

According to another embodiment, an encoded audio scene signal may have: a first encoded representation for a first frequency subband of a time frame of a at least two component signals of an audio scene, wherein the first encoded representation for the first frequency subband has M component signals; a second encoded representation for a second frequency subband of a time frame of the at least two component signals the second encoded representation for the second frequency subband has N component signals, wherein M is greater than N, wherein N is greater than or equal to 1, wherein the first frequency subband is separated from the second frequency subband by a predetermined border frequency; and one or more spatial parameters or one or more spatial parameter sets for the second frequency subband.

The present invention is based on the finding that an improved audio quality and a higher flexibility and, in general, an improved performance is obtained by applying a hybrid encoding/decoding scheme, where the spatial parameters used to generate a decoded two dimensional or three dimensional audio scene in the decoder are estimated in the decoder based on a coded transmitted and decoded typically lower dimensional audio representation for some parts of a time-frequency representation of the scheme, and are estimated, quantized and coded for other parts within the encoder and transmitted to the decoder.

Depending on the implementation, the division between the division between encoder-side estimated and decoder-side estimated regions can be diverging for different spatial parameters used in the generation of the three-dimensional or two-dimensional audio scene in the decoder.

In embodiments, this partition into different portions or advantageously time/frequency regions can be arbitrary. In an embodiment, however, it is advantageous to estimate the parameters in the decoder for parts of the spectrum that are mainly coded in a wave-form-preserving manner, while coding and transmitting encoder-calculated parameters for parts of the spectrum where parametric coding tools were mainly used.

Embodiments of the present invention aim to propose a low bit-rate coding solution for transmitting a 3D audio scene by employing a hybrid coding system where spatial parameters used for the reconstruction of the 3D audio scene are for some parts estimated and coded in the encoder and transmitted to the decoder, and for the remaining parts estimated directly in the decoder.

The present invention discloses a 3D audio reproduction based on a hybrid approach for a decoder only parameter estimation for parts of a signal where the spatial cues are retained well after bringing the spatial representation into a lower dimension in an audio encoder and encoding the lower dimension representation and estimating in the encoder, coding in the encoder, and transmitting the spatial cues and parameters from the encoder to the decoder for parts of the spectrum where the lower dimensionality together with the coding of the lower dimensional representation would lead to a sub-optimal estimation of the spatial parameters.

In an embodiment, an audio scene encoder is configured for encoding an audio scene, the audio scene comprising at least two component signals, and the audio scene encoder comprises a core encoder configured for core encoding the at least two component signals, where the core encoder generates a first encoded representation for a first portion of the at least two component signals and generates a second encoded representation for a second portion of the at least two component signals. The spatial analyzer analyzes the audio scene to derive one or more spatial parameters or one or more spatial parameter sets for the second portion and an output interface then forms the encoded audio scene signal which comprises the first encoded representation, the second encoded representation and the one or more spatial parameters or one or more spatial parameter sets for the second portion. Typically, any spatial parameters for the first portion are not included in the encoded audio scene signal, since those spatial parameters are estimated from the decoded first representation in a decoder. On the other hand, the spatial parameters for the second portion are already calculated within the audio scene encoder based on the original audio scene or an already processed audio scene which has been reduced with respect to its dimension and, therefore, with respect to its bitrate.

Thus, the encoder-calculated parameters can carry a high quality parametric information, since these parameters are calculated in the encoder from data which is highly accurate, not affected by core encoder distortions and potentially even available in a very high dimension such as a signal which is derived from a high quality microphone array. Due to the fact that such very high quality parametric information is preserved, it is then possible to core encode the second portion with less accuracy or typically less resolution. Thus, by quite coarsely core encoding the second portion, bits can be saved which can, therefore, be given to the representation of the encoded spatial metadata. Bits saved by a quite coarse encoding of the second portion can also be invested into a high resolution encoding of the first portion of the at least two component signals. A high resolution or high quality encoding of the at least two component signals is useful, since, at the decoder-side, any parametric spatial data does not exist for the first portion, but is derived within the decoder by a spatial analysis. Thus, by not calculating all spatial metadata in the encoder, but core-encoding at least two component signals, any bits that would, in the comparison case, be used for the encoded metadata can be saved and invested into the higher quality core encoding of the at least two component signals in the first portion.

Thus, in accordance with the present invention, the separation of the audio scene into the first portion and into the second portion can be done in a highly flexible manner, for example, depending on bitrate requirements, audio quality requirements, processing requirements, i.e., whether more processing resources are available in the encoder or the decoder, and so on. In an embodiment, the separation into the first and the second portion is done based on the core encoder functionalities. Particularly, for high quality and low bitrate core encoders that apply parametric coding operations for certain bands such as a spectral band replication processing or intelligent gap filling processing or noise filling processing, the separation with respect to the spatial parameters is performed in such a way that the non-parametrically encoded portions of the signal form the first portion and the parametrically encoded portions of the signal form the second portion. Thus, for the parametrically encoded second portion which typically are the lower resolution encoded portion of the audio signal, a more accurate representation of the spatial parameters is obtained while for the better encoded, i.e., high resolution encoded first portion, the high quality parameters are not so necessary, since quite high quality parameters can be estimated on the decoder-side using the decoded representation of the first portion.

In a further embodiment, and in order to even more reduce the bitrate, the spatial parameters for the second portion are calculated, within the encoder, in a certain time/frequency resolution which can be a high time/frequency resolution or a low time/frequency resolution. In case of a high time/frequency resolution, the calculated parameters are then grouped in a certain way in order to obtain low time/frequency resolution spatial parameters. These low time/frequency resolution spatial parameters are nevertheless high quality spatial parameters that only have a low resolution. The low resolution, however, is useful in that bits are saved for the transmission, since the number of spatial parameters for a certain time length and a certain frequency band are reduced. This reduction, however, is typically not so problematic, since the spatial data nevertheless does not change too much over time and, over frequency. Thus, a low bitrate but nevertheless good quality representation of the spatial parameters for the second portion can be obtained.

Since the spatial parameters for the first portion are calculated on the decoder-side and do not have to be transmitted anymore, any compromises with respect to resolution do not have to be performed. Therefore, a high time and high frequency resolution estimation of spatial parameters can be performed on the decoder-side and this high resolution parametric data then helps in providing a nevertheless good spatial representation of the first portion of the audio scene. Thus, the "disadvantage" of calculating the spatial parameters on the decoder-side based on the at least two transmitted components for the first portion can be reduced or even eliminated by calculating high time and frequency resolution spatial parameters and by using these parameters in the spatial rendering of the audio scene. This does not incur any penalty in a bit rate, since any processing performed on the decoder-side does not have any negative influence on the transmitted bitrate in an encoder/decoder scenario.

A further embodiment of the present invention relies on a situation, where, for the first portion, at least two components are encoded and transmitted so that, based on the at least two components, a parametric data estimation can be performed on the decoder-side. In an embodiment, however, the second portion of the audio scene can even be encoded with a substantially lower bitrate, since it is of advantage to only encode a single transport channel for the second representation. This transport or downmix channel is represented by a very low bitrate compared to the first portion, since, in the second portion, only a single channel or component is to be encoded while, in the first portion, two or more components are to be encoded so that enough data for a decoder-side spatial analysis is there.

Thus, the present invention provides additional flexibility with respect to bitrate, audio quality, and processing requirements available on the encoder or the decoder-side.

BRIEF DESCRIPTION OF THE DRAWINGS

Embodiments of the present invention are subsequently described with respect to the accompanying drawings, in which.

DETAILED DESCRIPTION OF THE INVENTION

Figure 1A:
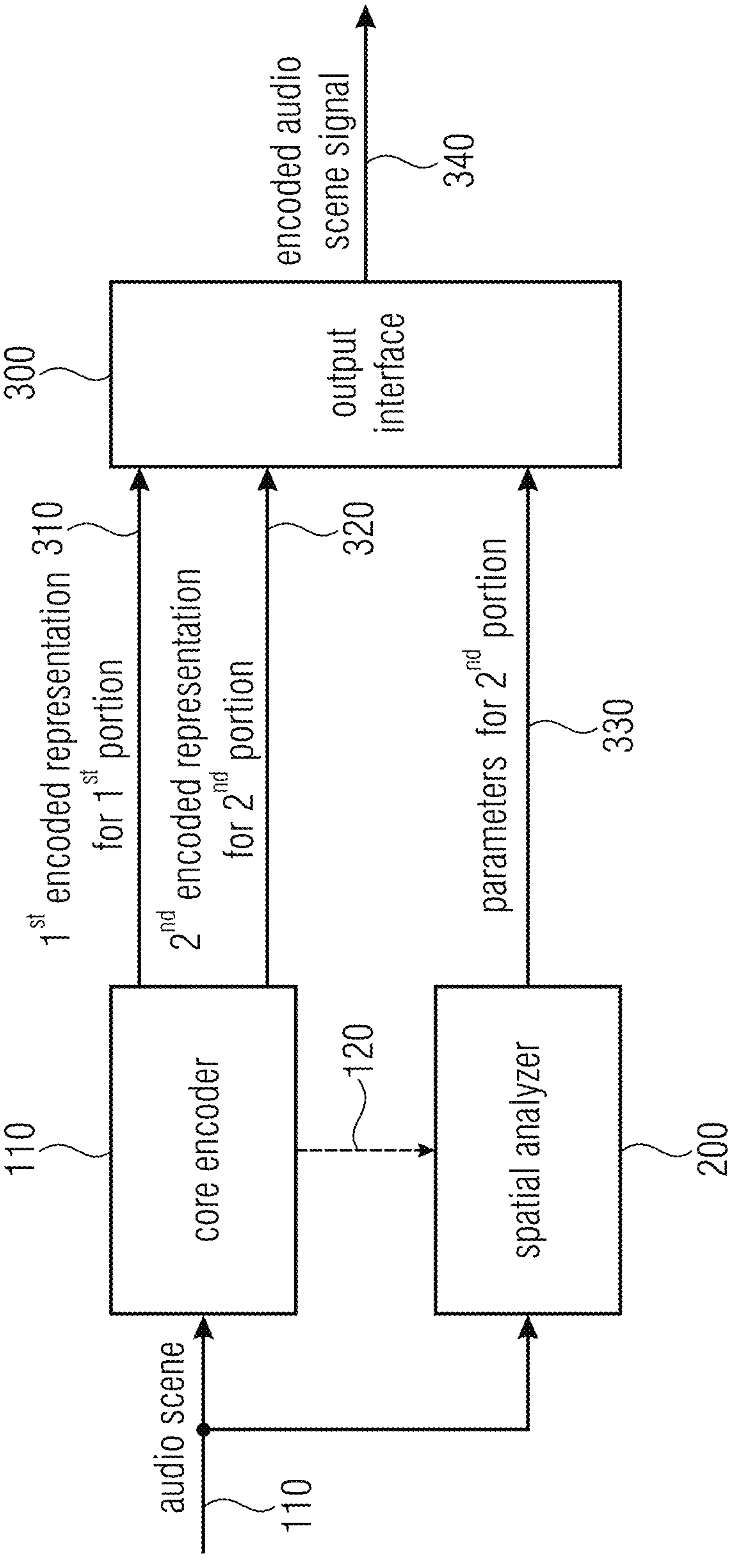
FIG. 1A is a block diagram of an embodiment of an audio scene encoder.

FIG. 1A illustrates an audio scene encoder for encoding an audio scene 110 that comprises at least two component signals. The audio scene encoder comprises a core encoder 100 for core encoding the at least two component signals. Specifically, the core encoder 100 is configured to generate a first encoded representation 310 for a first portion of the at least two component signals and to generate a second encoded representation 320 for a second portion of the at least two component signals. The audio scene encoder comprises a spatial analyzer for analyzing the audio scene to derive one or more spatial parameters or one or more spatial parameter sets for the second portion. The audio scene encoder comprises an output interface 300 for forming an encoded audio scene signal 340. The encoded audio scene signal 340 comprises the first encoded representation 310 representing the first portion of the at least two component signals, the second encoder representation 320 and parameters 330 for the second portion. The spatial analyzer 200 is configured to apply the spatial analysis for the first portion of the at least two component signals using the original audio scene 110. Alternatively, the spatial analysis can also be performed based on a reduced dimension representation of the audio scene. If, for example, the audio scene 110 comprises, for example, a recording of several microphones arranged in a microphone array, then the spatial analysis 200 can, of course, be performed based on this data. However, the core encoder 100 would then be configured to reduce the dimensionality of the audio scene to, for example, a first order Ambisonics representation or a higher order Ambisonics representation. In a basic version, the core encoder 100 would reduce the dimensionality to at least two components consisting of, for example, an omnidirectional component and at least one directional component such as X, Y, or Z of a B-format representation. However, other representations such as higher order representations or an A-format representations are useful as well. The first encoder representation for the first portion would then consist of at least two different components being decodable and will typically, consist of an encoded audio signal for each component.

The second encoder representation for the second portion can consist of the same number of components or can, alternatively, have a lower number such as only a single omnidirectional component that has been encoded by the core coder in a second portion. In case of the implementation where the core encoder 100 reduces the dimensionality of the original audio scene 110, the reduced dimensionality audio scene optionally can be forwarded to the spatial analyzer via line 120 instead of the original audio scene.

Figure 1B:
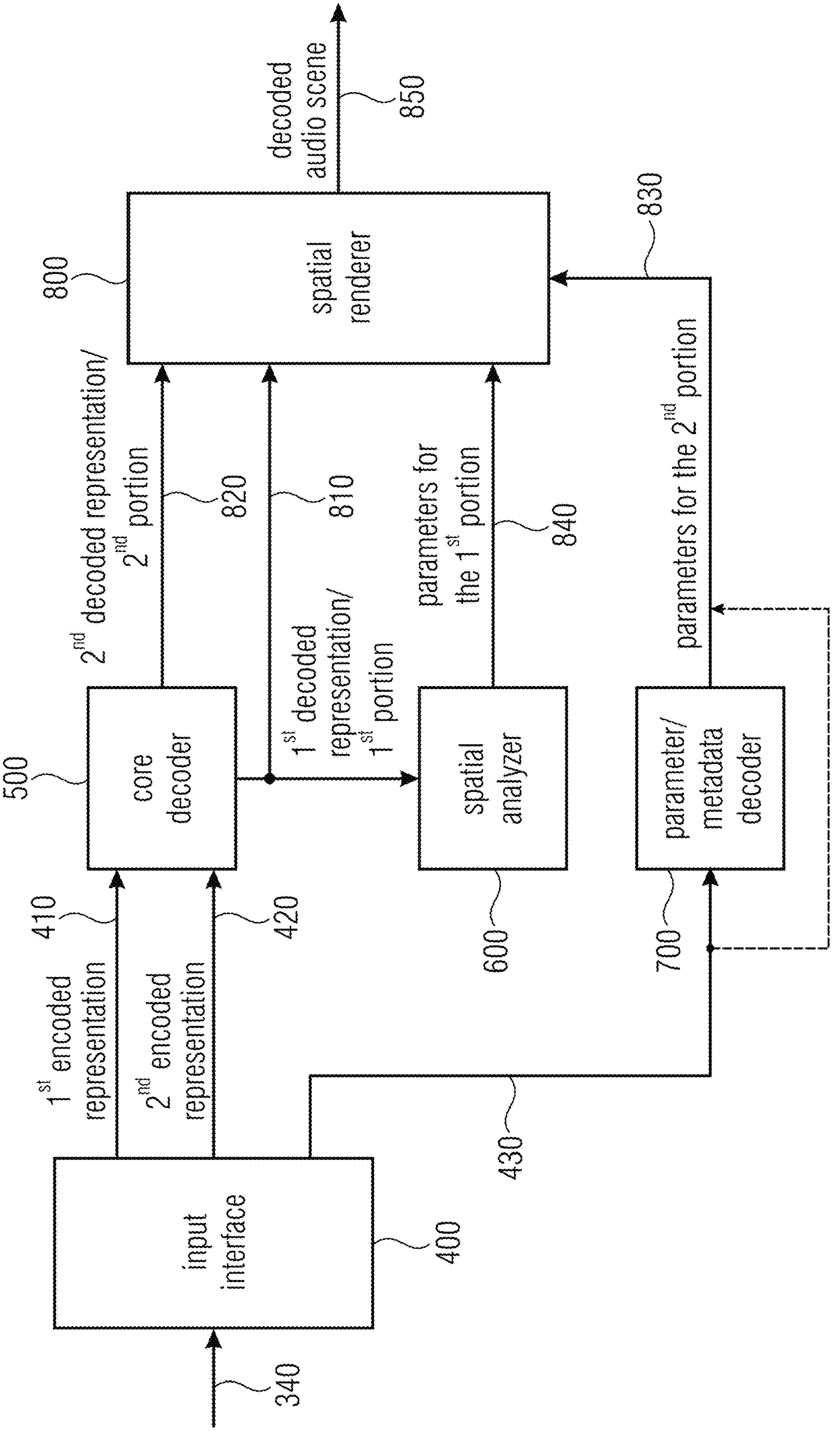
FIG. 1B is a block diagram of an embodiment of an audio scene decoder.
Figure 2B:
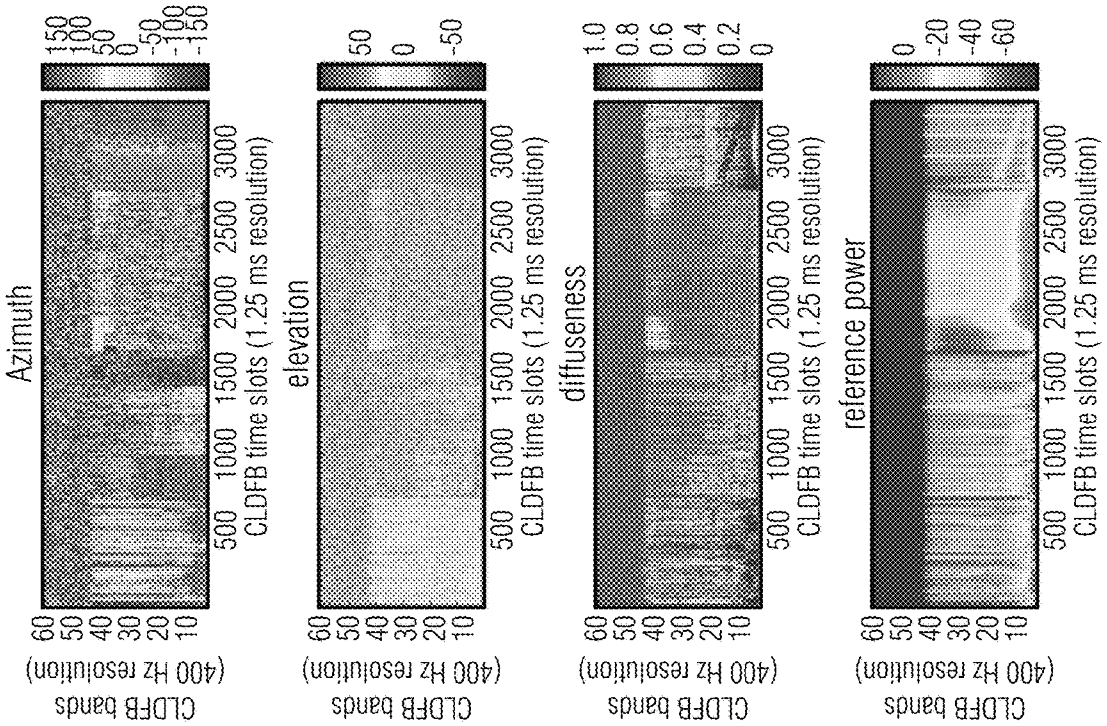
FIG. 2B is a DirAC analysis from a coded lower-dimensional signal.
Figure 2A:
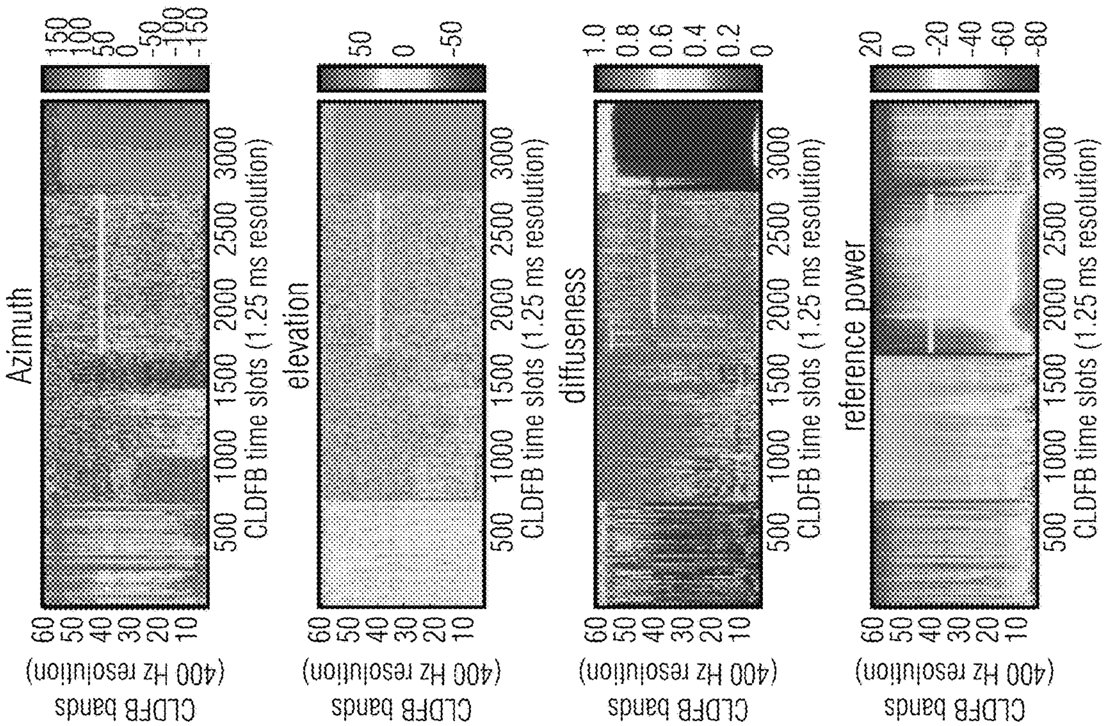
FIG. 2A is a DirAC analysis from an uncoded signal.

FIG. 1B illustrates an audio scene decoder comprising an input interface 400 for receiving an encoded audio scene signal 340. This encoded audio scene signal comprises the first encoded representation 410, the second encoded representation 420 and one or more spatial parameters for the second portion of the at least two component signals illustrated at 430. The encoded representation of the second portion can, once again, be an encoded single audio channel or can comprise two or more encoded audio channels, while the first encoded representation of the first portion comprises at least two different encoded audio signals. The different encoded audio signals in the first encoded representation or, if available, in the second encoded representation can be jointly coded signals such as a jointly coded stereo signal or are, alternatively, and even advantageously, individually encoded mono audio signals.

The encoded representation comprising the first encoded representation 410 for the first portion and the second encoded representation 420 for the second portion is input into a core decoder for decoding the first encoded representation and the second encoded representation to obtain a decoded representation of the at least two component signals representing an audio scene. The decoded representation comprises a first decoded representation for the first portion indicated at 810 and a second decoded representation for a second portion indicated at 820. The first decoded representation is forwarded to a spatial analyzer 600 for analyzing a portion of the decoded representation corresponding to the first portion of the at least two component signals to obtain one or more spatial parameters 840 for the first portion of the at least two component signals. The audio scene decoder also comprises a spatial rendered 800 for spatially rendering the decoded representation which comprises, in the FIG. 1B embodiment, the first decoded representation for the first portion 810 and the second decoded representation for the second portion 820. The spatial renderer 800 is configured to use, for the purpose of audio rendering, the parameters 840 derived from the spatial analyzer for the first portion and, for the second portion, parameters 830 that are derived from the encoded parameters via a parameter/metadata decoder 700. In case of a representation of the parameters in the encoded signal in a non-encoded form, the parameter/metadata decoder 700 is not necessary and the one or more spatial parameters for the second portion of the at least two component signals are directly forwarded from the input interface 400, subsequent to a demultiplex or a certain processing operation, to the spatial renderer 800 as data 830.

Figure 6A:
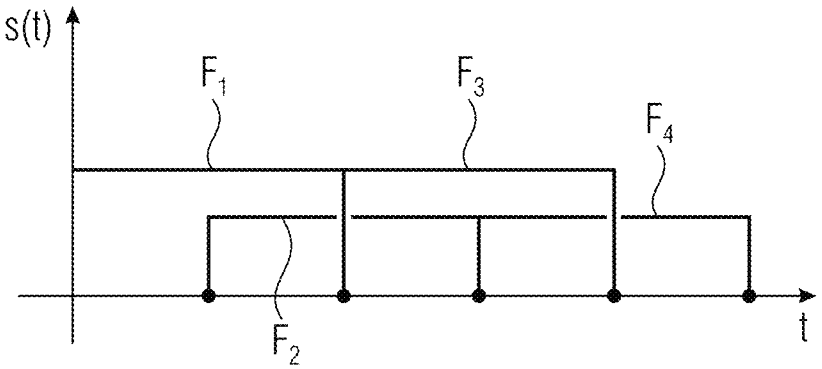
FIG. 6A illustrates different overlapping time frames as an example for different portions.

FIG. 6A illustrates a schematic representation of different typically overlapping time frames $F_1$ to $F_4$. The core encoder 100 of FIG. 1A can be configured to form such subsequent time frames from the at least two component signals. In such a situation, a first time frame could be the first portion and the second time frame could be the second portion. Thus, in accordance with an embodiment of the invention, the first portion could be the first time frame and the second portion could be another time frame, and switching between the first and the second portion could be performed over time. Although FIG. 6A illustrates overlapping time frames, non-overlapping time frames are useful as well. Although FIG. 6A illustrates time frames having equal lengths, the switching could be done with time frames that have different lengths. Thus, when the time frame $F_2$ is, for example, smaller than the time frame $F_1$, then this would result in an increased time resolution for the second time frame $F_2$ with respect to the first time frame $F_1$. Then, the second time frame $F_2$ with the increased resolution would advantageously correspond to the first portion that is encoded with respect to its components, while the first time portion, i.e., the low resolution data would correspond to the second portion that is encoded with a lower resolution but the spatial parameters for the second portion would be calculated with any resolution entailed, since the whole audio scene is available at the encoder.

Figure 6B:
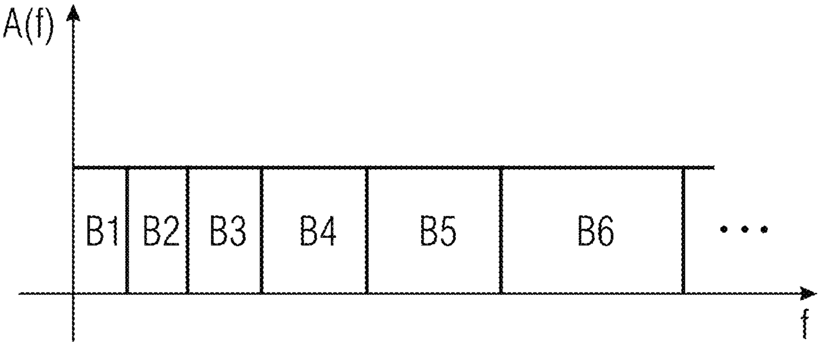
FIG. 6B illustrates different frequency bands as an example for different portions.

FIG. 6B illustrates an alternative implementation where the spectrum of the at least two component signals is illustrated as having a certain number of bands B1, B2, . . . , B6, Advantageously, the bands are separated in bands with different bandwidths that increase from lowest to highest center frequencies in order to have a perceptually motivated band division of the spectrum. The first portion of the at least two component signals could, for example, consist of the first four bands, for example, the second portion could consist of bands B5 and bands B6. This would match with a situation, where the core encoder performs a spectral band replication and where the crossover frequency between the non-parametrically encoded low frequency portion and the parametrically encoded high frequency portion would be the border between the band B4 and the band B5.

Alternatively, in case of intelligent gap filling (IGF) or noise filling (NF), the bands are arbitrarily selected in line with a signal analysis and, therefore, the first portion could, for example, consist of bands B1, B2, B4, B6 and the second portion could be B3, B5 and probably another higher frequency band. Thus, a very flexible separation of the audio signal into bands can be performed, irrespective of whether the bands are, as is of advantage and illustrated in FIG. 6B, typical scale factor bands that have an increasing bandwidth from lowest to highest frequencies, or whether the bands are equally sized bands. The borders between the first portion and the second portion do not necessarily have to coincide with scale factor bands that are typically used by a core encoder, but it is of advantage to have the coincidence between a border between the first portion and the second portion and a border between a scale factor band and an adjacent scale factor band.

Figure 7A:
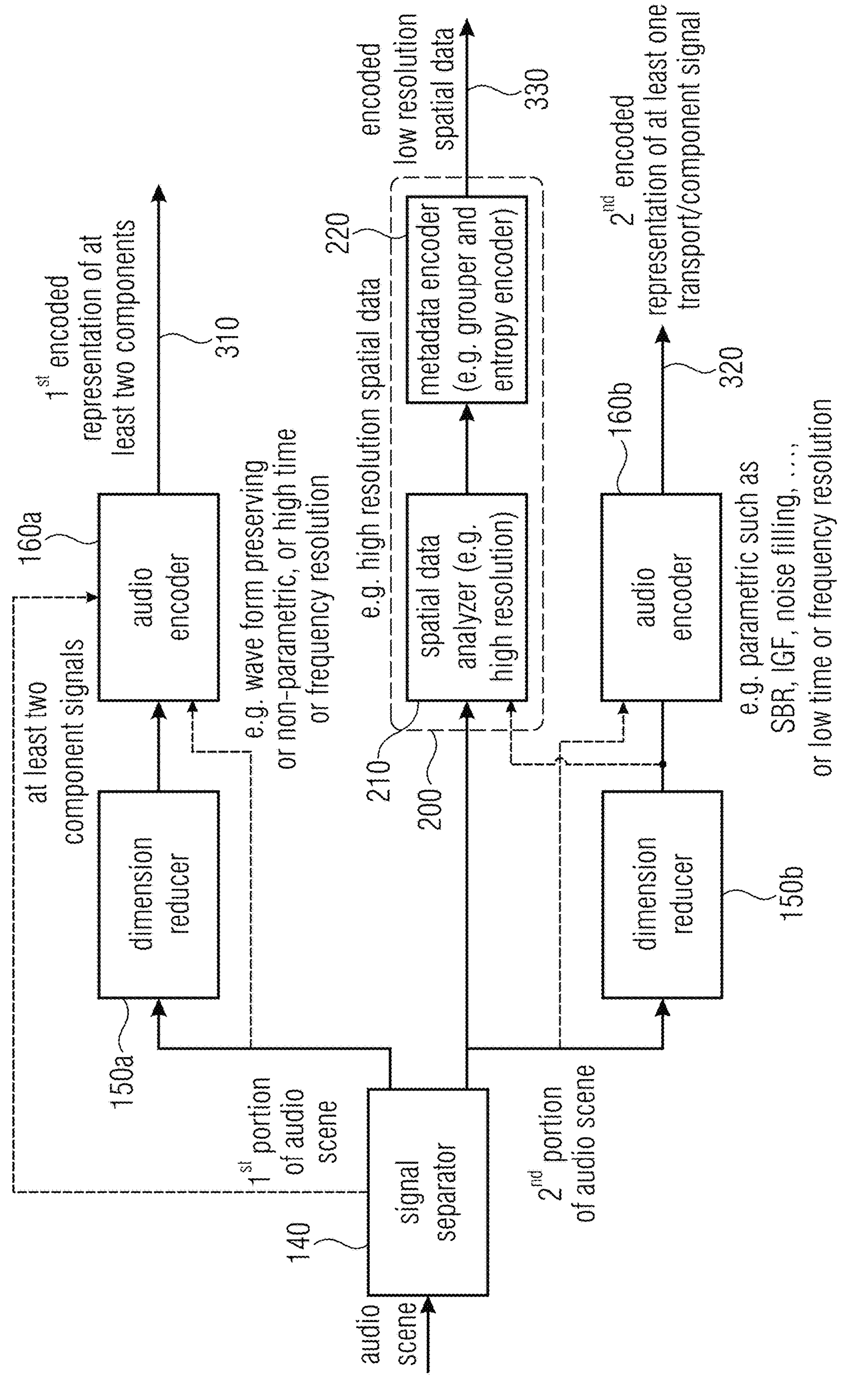
FIG. 7A illustrates a further embodiment of an audio scene encoder.

FIG. 7A illustrates an implementation of an audio scene encoder. Particularly, the audio scene is input into a signal separator 140 that may be the portion of the core encoder 100 of FIG. 1A.

The core encoder 100 of FIG. 1A comprises a dimension reducer 150*a* and 150*b* for both portions, i.e., the first portion of the audio scene and the second portion of the audio scene. At the output of the dimension reducer 150*a*, there does exist at least two component signals that are then encoded in an audio encoder 160*a* for the first portion. The dimension reducer 150*b* for the second portion of the audio scene can comprise the same constellation as the dimension reducer 150*a*. Alternatively, however, the reduced dimension obtained by the dimension reducer 150*b* can be a single transport channel that is then encoded by the audio encoder 160*b* in order to obtain the second encoded representation 320 of at least one transport/component signal.

The audio encoder 160*a* for the first encoded representation can comprise a wave form preserving or non-parametric or high time or high frequency resolution encoder while the audio encoder 160*b* can be a parametric encoder such as an SBR encoder, an IGF encoder, a noise filling encoder, or any low time or frequency resolution or so. Thus, the audio encoder 160*b* will typically result in a lower quality output representation compared to the audio encoder 160*a*. This "disadvantage" is addressed by performing a spatial analysis via the spatial data analyzer 210 of the original audio scene or, alternatively, a dimension reduced audio scene when the dimension reduced audio scene still comprises at least two component signals. The spatial data obtained by the spatial data analyzer 210 are then forwarded to a metadata encoder 220 that outputs an encoded low resolution spatial data. Both blocks 210, 220 may be included in the spatial analyzer block 200 of FIG. 1A.

Advantageously, the spatial data analyzer performs a spatial data analysis with a high resolution such as a high frequency resolution or a high time resolution and, the, in order to keep the used bitrate for the encoded metadata in a reasonable range, the high resolution spatial data may be grouped and entropy encoded by the metadata encoder in order to have an encoded low resolution spatial data. When, for example, a spatial data analysis is performed for, for example, eight time slots per frame and ten bands per time slot, one could group the spatial data into a single spatial parameter per frame and, for example, five bands per parameter.

It is of advantage to calculate directional data on the one hand and diffuseness data on the other hand. The metadata encoder 220 could then be configured to output the encoded data with different time/frequency resolutions for the directional and diffuseness data. Typically, directional data is used with a higher resolution than diffuseness data. As advantageous way in order to calculate the parametric data with different resolutions is to perform the spatial analysis with a high resolution for and typically an equal resolution for both parametric kinds and to then perform a grouping in time and/or frequency with the different parametric information for the different parameter kinds in different ways in order to then have an encoded low resolution spatial data output 330 that has, for example, a medium resolution with time and/or frequency for the directional data and a low resolution for the diffuseness data.

Figure 7B:
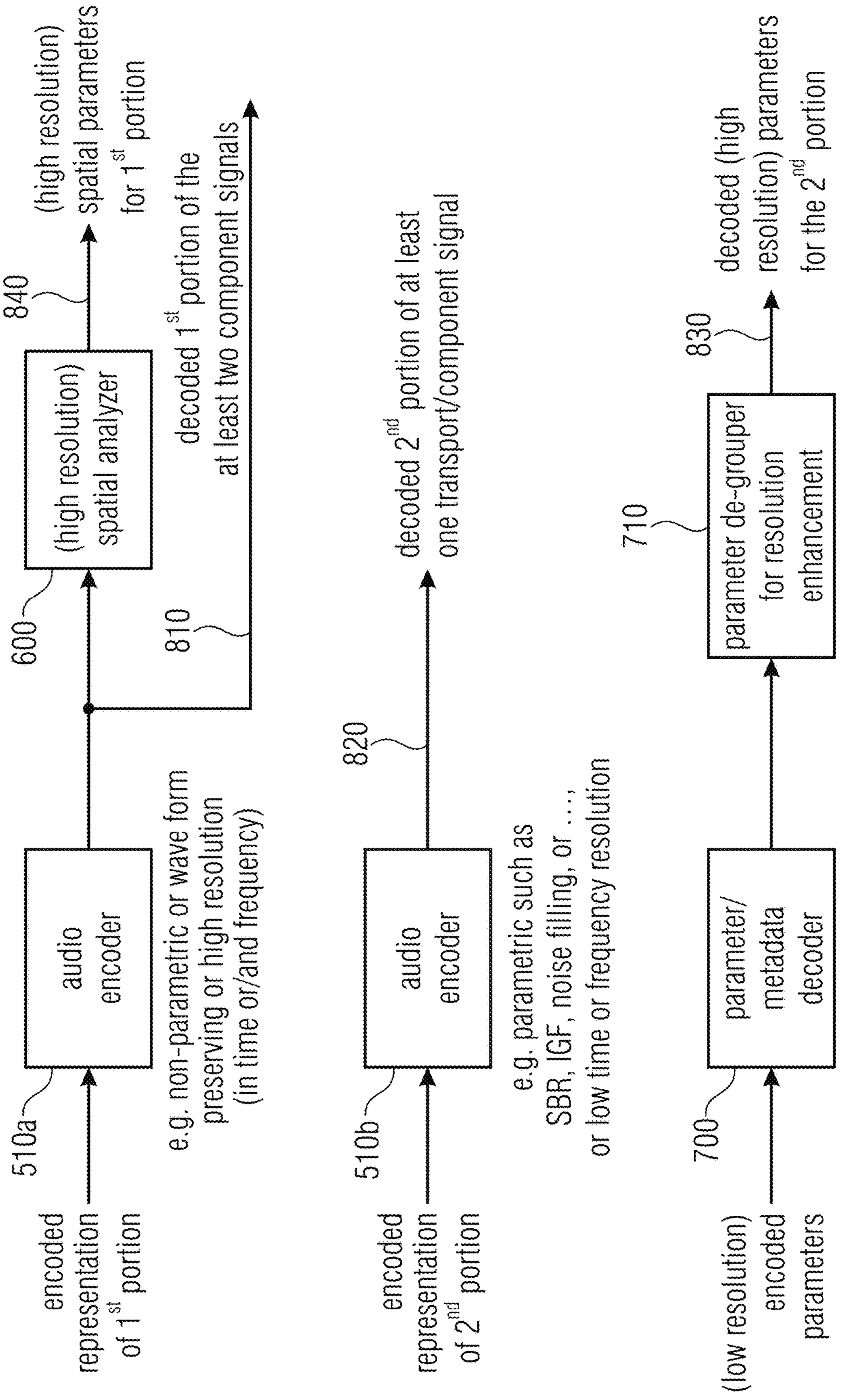
FIG. 7B illustrates an embodiment of an audio scene decoder.

FIG. 7B illustrates a corresponding decoder-side implementation of the audio scene decoder.

The core decoder 500 of FIG. 1B comprises, in the FIG. 7B embodiment, a first audio decoder instance 510*a* and a second audio decoder instance 510*b*. Advantageously, the first audio decoder instance 510*a* is a non-parametric or wave form preserving or high resolution (in time and/or frequency) encoder that generates, at the output, a decoded first portion of the at least two component signals. This data 810 is, on the one hand, forwarded to the spatial renderer 800 of FIGS. 1B and 1*s*, additionally input into a spatial analyzer 600. Advantageously, the spatial analyzer 600 is a high resolution spatial analyzer that may calculate high resolution spatial parameters for the first portion. Typically, the resolution of the spatial parameters for the first portion is higher than the resolution that is associated with the encoded parameters that are input into the parameter/metadata decoder 700. However, the entropy decoded low time or frequency resolution spatial parameters output by block 700 are input into a parameter de-grouper for resolution enhancement 710. Such a parameter de-grouping can be performed by copying a transmitted parameter to certain time/frequency tiles, where the de-grouping is performed in line with the corresponding grouping performed in the encoder-side metadata encoder 220 of FIG. 7A. Naturally, together with de-grouping, further processing or smoothing operations can be performed as needed.

The result of block 710 is then a collection of decoded advantageously high resolution parameters for the second portion that typically have the same resolution than the parameters 840 for the first portion. Also, the encoded representation of the second portion is decoded by the audio decoder 510*b* to obtain the decoded second portion 820 of typically at least one or of a signal having at least two components.

Figure 3:
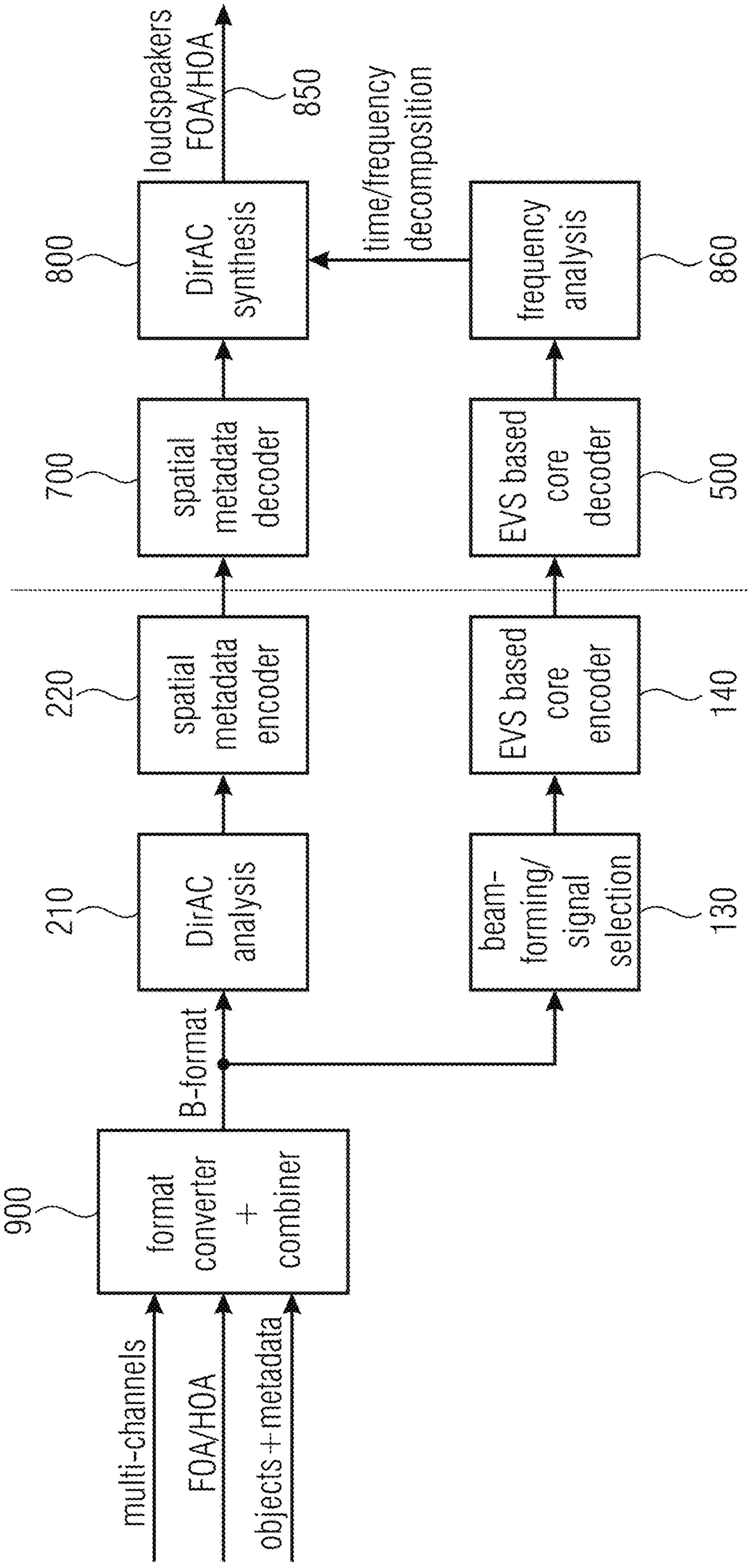
FIG. 3 is a system overview of an encoder and a decoder combining DirAC spatial sound processing with an audio coder.
Figure 4A:
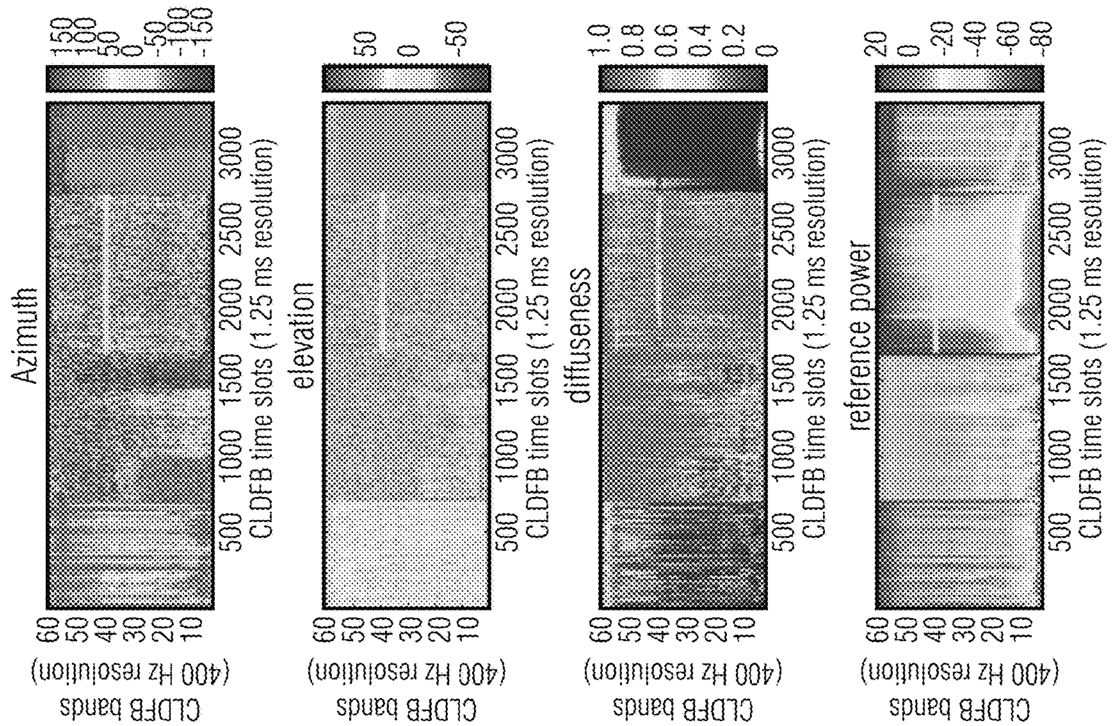
FIG. 4A is a DirAC analysis from an uncoded signal.
Figure 4B:
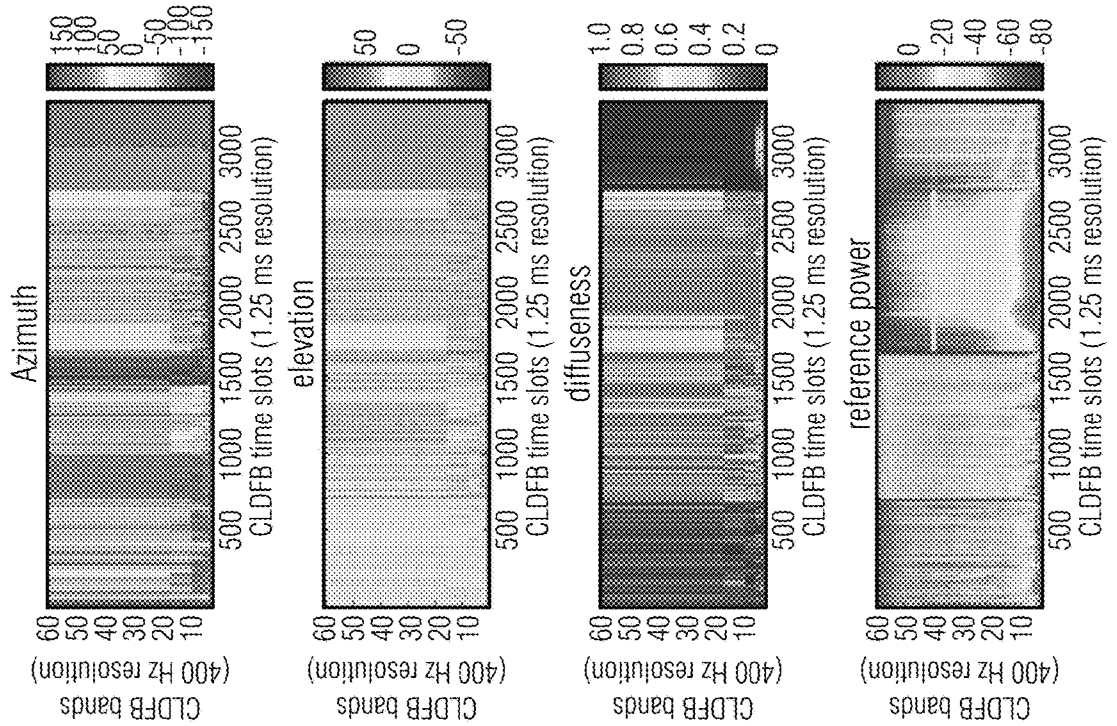
FIG. 4B is a DirAC analysis from an uncoded signal using grouping of parameters in the time-frequency domain and quantization of the parameters
Figure 8A:
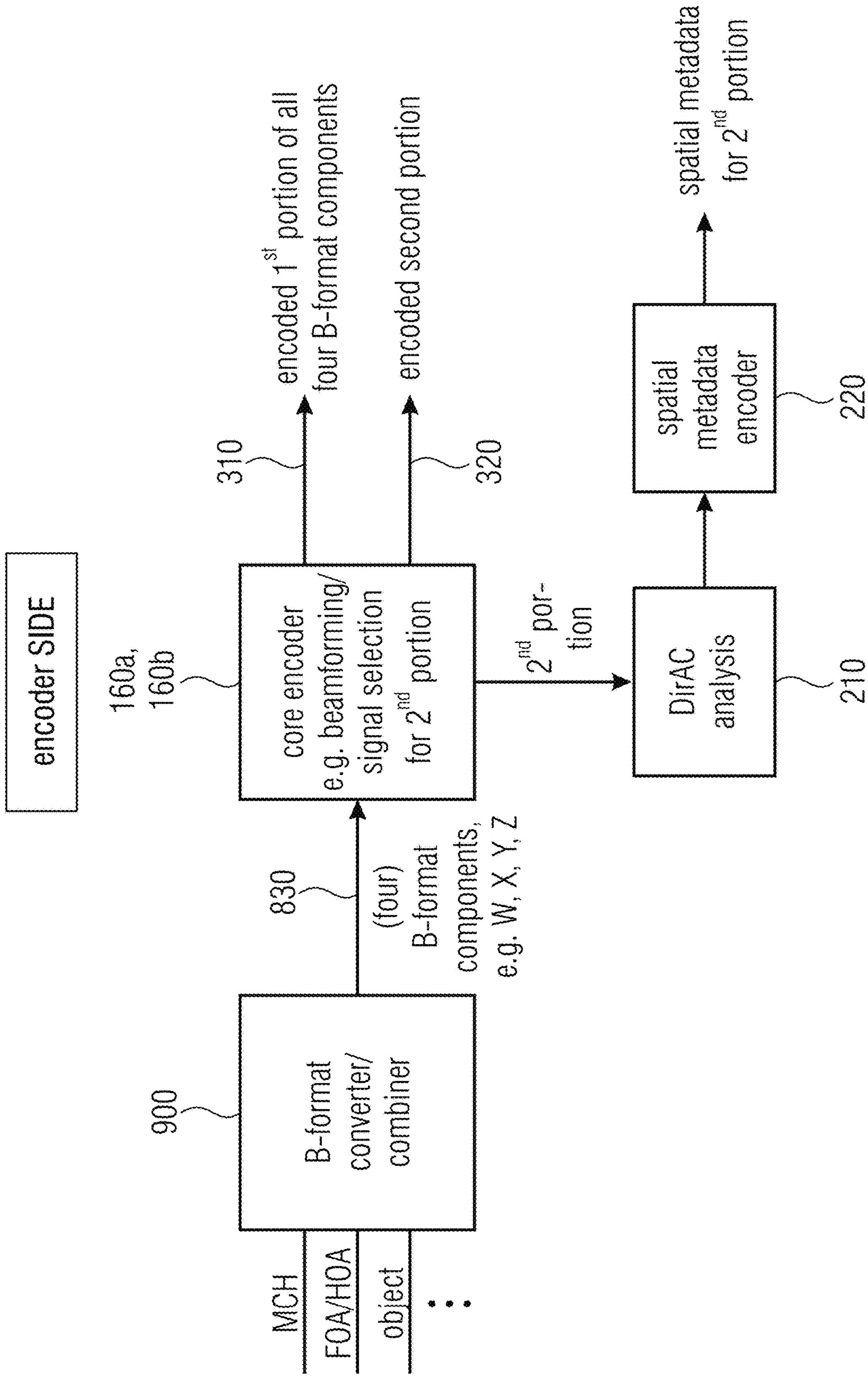
FIG. 8A illustrates a further embodiment of an audio scene encoder.

FIG. 8A illustrates an implementation of an encoder relying on the functionalities discussed with respect to FIG. 3. Particularly, multi-channel input data or first order Ambisonics or high order Ambisonics input data or object data is input into a B-format converter that converts and combines individual input data in order to generate, for example, typically four B-format components such as an omnidirectional audio signal and three directional audio signals such as X, Y and Z.

Alternatively, the signal input into the format converter or the core encoder could be a signal captured by an omnidirectional microphone positioned at the first portion and another signal captured by an omnidirectional microphone positioned at the second portion different from the first portion. Again, alternatively, the audio scene comprises, as a first component signal, a signal captured by a directional microphone directed to a first direction and, as a second component, at least one signal captured by another directional microphone directed to a second direction different from the first direction. These "directional microphones" do not necessarily have to be real microphones but can also be virtual microphones.

The audio input into block 900 or output by block 900 or generally used as the audio scene can comprise A-format component signals, B-format component signals, first order Ambisonics component signals, higher order Ambisonics component signals or component signals captured by a microphone array with at least two microphone capsules or component signals calculated from a virtual microphone processing.

The output interface 300 of FIG. 1A is configured to not include any spatial parameters from the same parameter kind as the one or more spatial parameters generated by the spatial analyzer for the second portion into the encoded audio scene signal.

Thus, when the parameters 330 for the second portion are direction of arrival data and diffuseness data, the first encoded representation for the first portion will not comprise directional of arrival data and diffuseness data but can, of course, comprise any other parameters that have been calculated by the core encoder such as scale factors, LPC coefficients, etc.

Moreover, the band separation performed by signal separator 140, when the different portions are different bands can be implemented in such a way that a start band for the second portion is lower than the bandwidth extension start band and, additionally, the core noise filling does not necessarily have to apply any fixed crossover band, but can be used gradually for more parts of the core spectra as the frequency increases.

Moreover, the parametric or largely parametric processing for the second frequency subband of a time frame comprises calculating an amplitude-related parameter for the second frequency band and the quantization and entropy coding of this amplitude-related parameter instead of individual spectral lines in the second frequency subband. Such an amplitude related parameter forming a low resolution representation of the second portion is, for example, given by a spectral envelope representation having only, for example, one scale factor or energy value for each scale factor band, while the high resolution first portion relies on individual MDCT or FFT or general, individual spectral lines.

Thus, a first portion of the at least two component signals is given by a certain frequency band for each component signal, and the certain frequency band for each component signal is encoded with a number of spectral lines to obtain the encoded representation of the first portion. With respect to the second portion, however, an amplitude-related measure such as the sum of the individual spectral lines for the second portion or a sum of squared spectral lines representing an energy in the second portion or the sum of spectral lines raised to the power of three representing a loudness measure for the spectral portion can be used as well for the parametric encoded representation of the second portion.

Figure 8B:
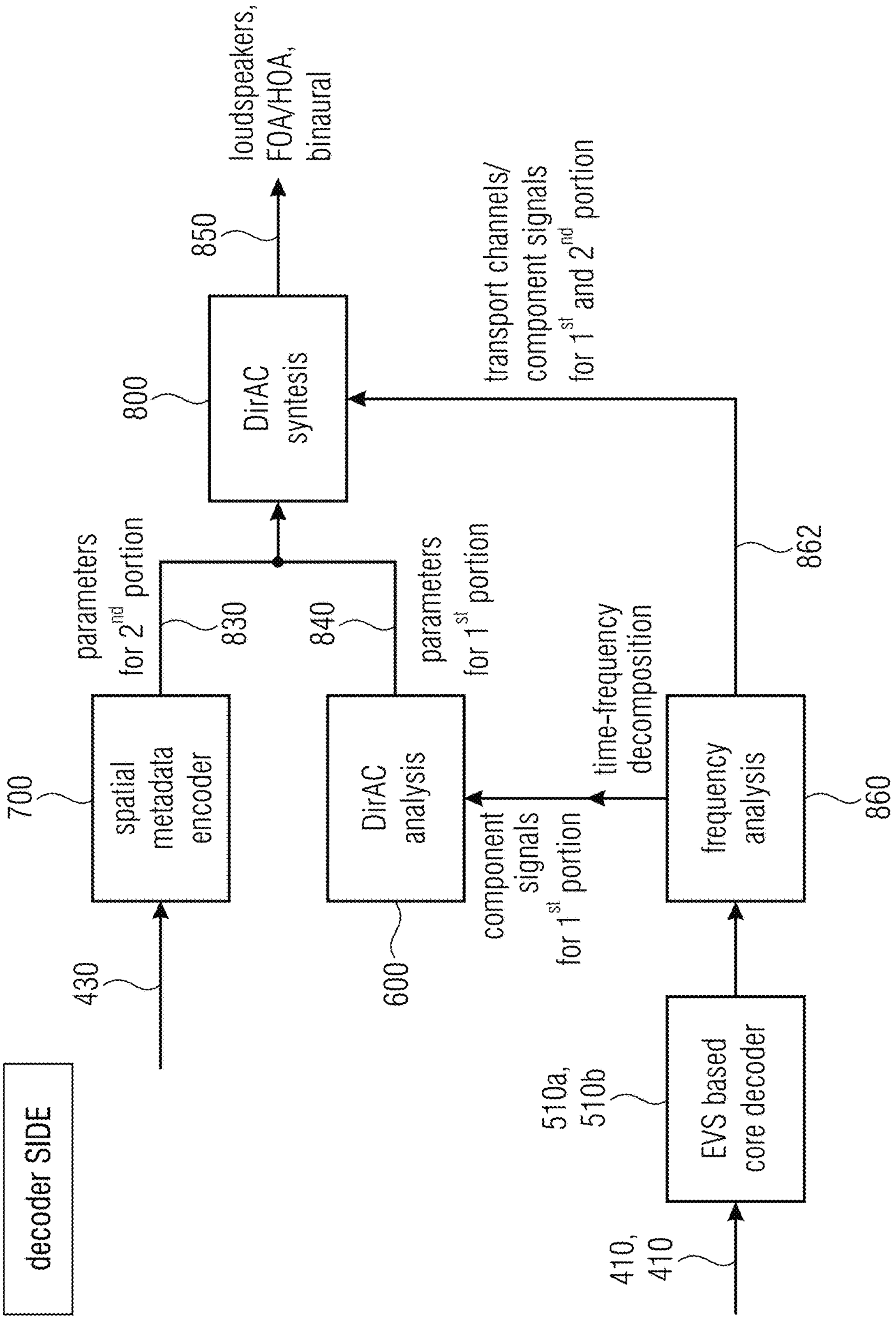
FIG. 8B illustrates a further embodiment of an audio scene decoder.

Again referring to FIG. 8A, the core encoder 160 comprising of the individual core encoder branches 160*a*, 160*b* may comprise a beamforming/signal selection procedure for the second portion. Thus, the core encoder indicated at 160*a*, 160*b* in FIG. 8B outputs, on the one hand, an encoded first portion of all four B-format components and an encoded second portion of a single transport channel and spatial metadata for the second portion that have been generated by a DirAC analysis 210 relying on the second portion and a subsequently connected spatial metadata encoder 220.

On the decoder-side, the encoded spatial metadata is input into the spatial metadata decoder 700 to generate the parameters for the second portion illustrated at 830. The core decoder which is an embodiment typically implemented as an EVS-based core decoder consisting of elements 510*a*, 510*b* outputs the decoded representation consisting of both portions where, however, both portions are not yet separated. The decoded representation is input into a frequency analyzing block 860 and the frequency analyzer 860 generates the component signals for the first portion and forwards same to a DirAC analyzer 600 to generate the parameters 840 for the first portion. The transport channel/component signals for the first and the second portions are forwarded from the frequency analyzer 860 to the DirAC synthesizer 800. Thus, the DirAC synthesizer operates, in an embodiment, as usual, since the DirAC synthesizer does not have any knowledge and actually does not require any specific knowledge, whether the parameters for the first portion and the second portion have been derived on the encoder side or on the decoder side. Instead, both parameters "do the same" for the DirAC synthesizer 800 and the DirAC synthesizer can then generate, based on the frequency representation of the decoded representation of the at least two component signals representing the audio scene indicated at 862 and the parameters for both portions, a loudspeaker output, a first order Ambisonics (FOA), a high order Ambisonics (HOA) or a binaural output.

Figure 9A:
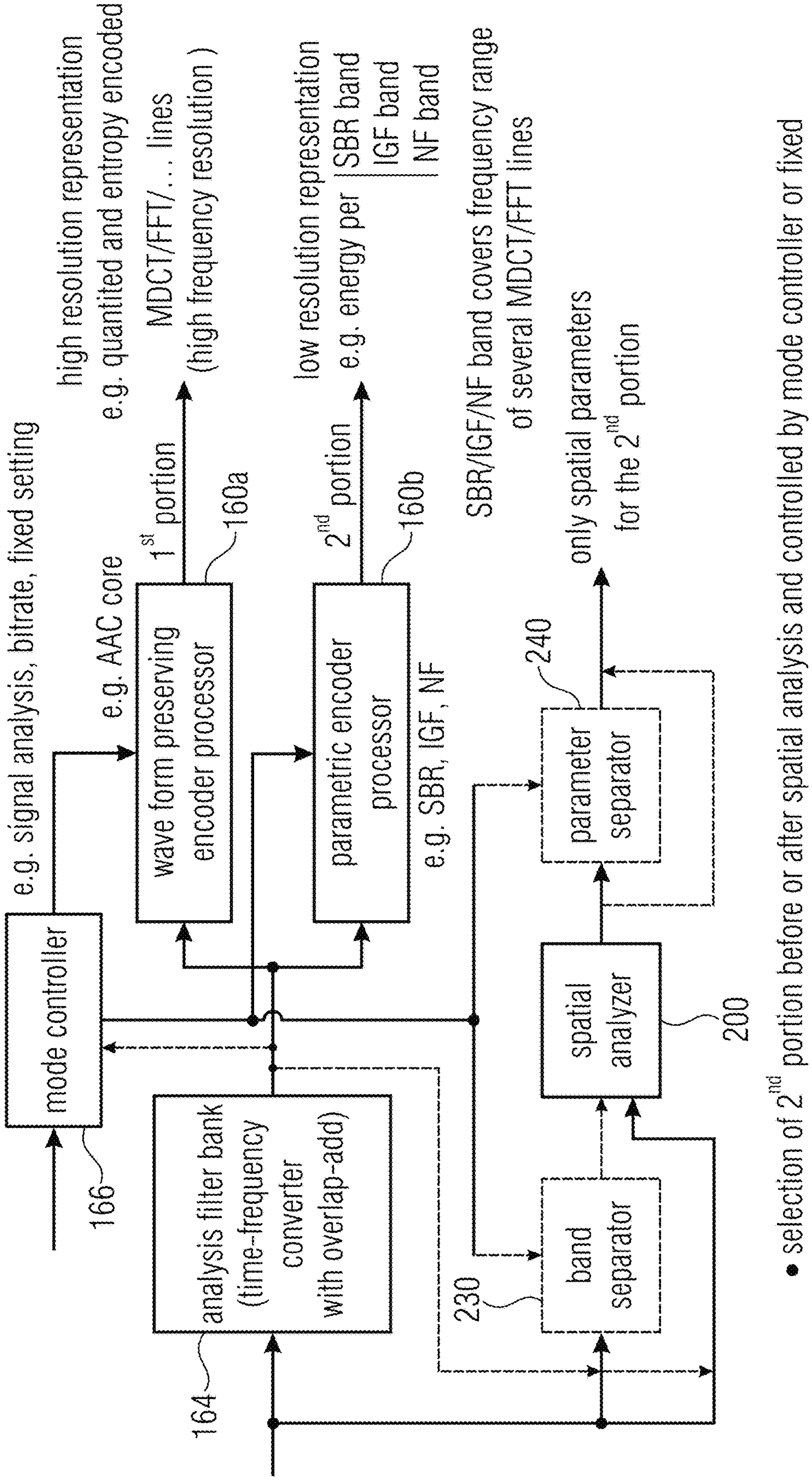
FIG. 9A illustrates a further embodiment of an audio scene encoder with a frequency domain core encoder.

FIG. 9A illustrates another embodiment of an audio scene encoder, where the core encoder 100 of FIG. 1A is implemented as a frequency domain encoder. In this implementation, the signal to be encoded by the core encoder is input into an analysis filter bank 164 advantageously applying a time-spectral conversion or decomposition with typically overlapping time frames. The core encoder comprises a wave form preserving encoder processor 160*a* and a parametric encoder processor 160*b*. The distribution of the spectral portions into the first portion and the second portion is controlled by a mode controller 166. The mode controller 166 can rely on a signal analysis, a bitrate control or can apply a fixed setting. Typically, the audio scene encoder can be configured to operate at different bitrates, wherein a predetermined border frequency between the first portion and the second portion depends on a selected bitrate, and wherein a predetermined border frequency is lower for a lower bitrate or greater for a greater bitrate.

Alternatively, the mode controller can comprise a tonality mask processing as known from intelligent gap filling that analyzes the spectrum of the input signal in order to determine bands that have to be encoded with a high spectral resolution that end up in the encoded first portion and to determine bands that can be encoded in a parametric way that will then end up in the second portion. The mode controller 166 is configured to also control the spatial analyzer 200 on the encoder-side and advantageously to control a band separator 230 of the spatial analyzer or a parameter separator 240 of the spatial analyzer. This makes sure that, in the end, only spatial parameters for the second portion, but not for the first portion are generated and output into the encoded scene signal.

Particularly, when the spatial analyzer 200 directly receives the audio scene signal either before being input into the analysis filter bank or subsequent to being input into the filter bank, the spatial analyzer 200 calculates a full analysis over the first and the second portion and, the parameter separator 240 then only selects for output into the encoded scene signal the parameters for the second portion. Alternatively, when the spatial analyzer 200 receives input data from a band separator, then the band separator 230 already forwards only the second portion and, then, a parameter separator 240 is not required anymore, since the spatial analyzer 200 anyway only receives the second portion and, therefore, only outputs the spatial data for the second portion.

Figure 5A:
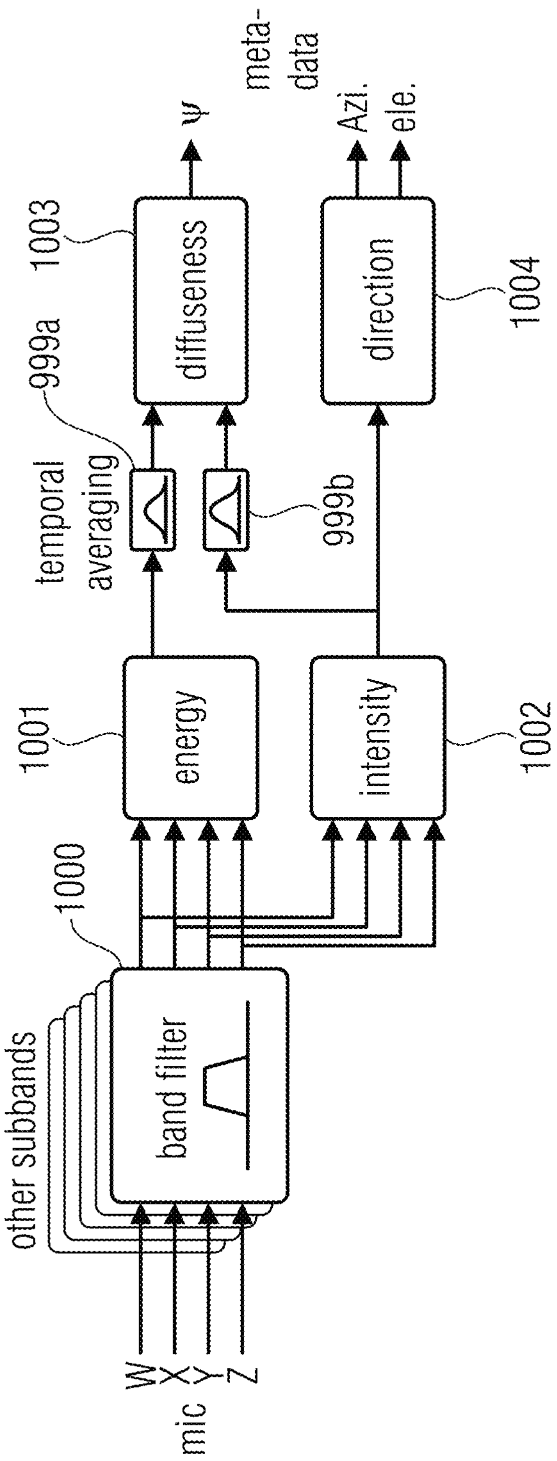
Fig. 5A (PRIOR ART)
FIG. 5A is a known DirAC analysis stage.

Thus, a selection of the second portion can be performed before or after the spatial analysis and may be controlled by the mode controller 166 or can also be implemented in a fixed manner. The spatial analyzer 200 relies on an analysis filter bank of the encoder or uses his own separate filter bank that is not illustrated in FIG. 9A, but that is illustrated, for example, in FIG. 5A for the DirAC analysis stage implementation indicated at 1000.

Figure 9B:
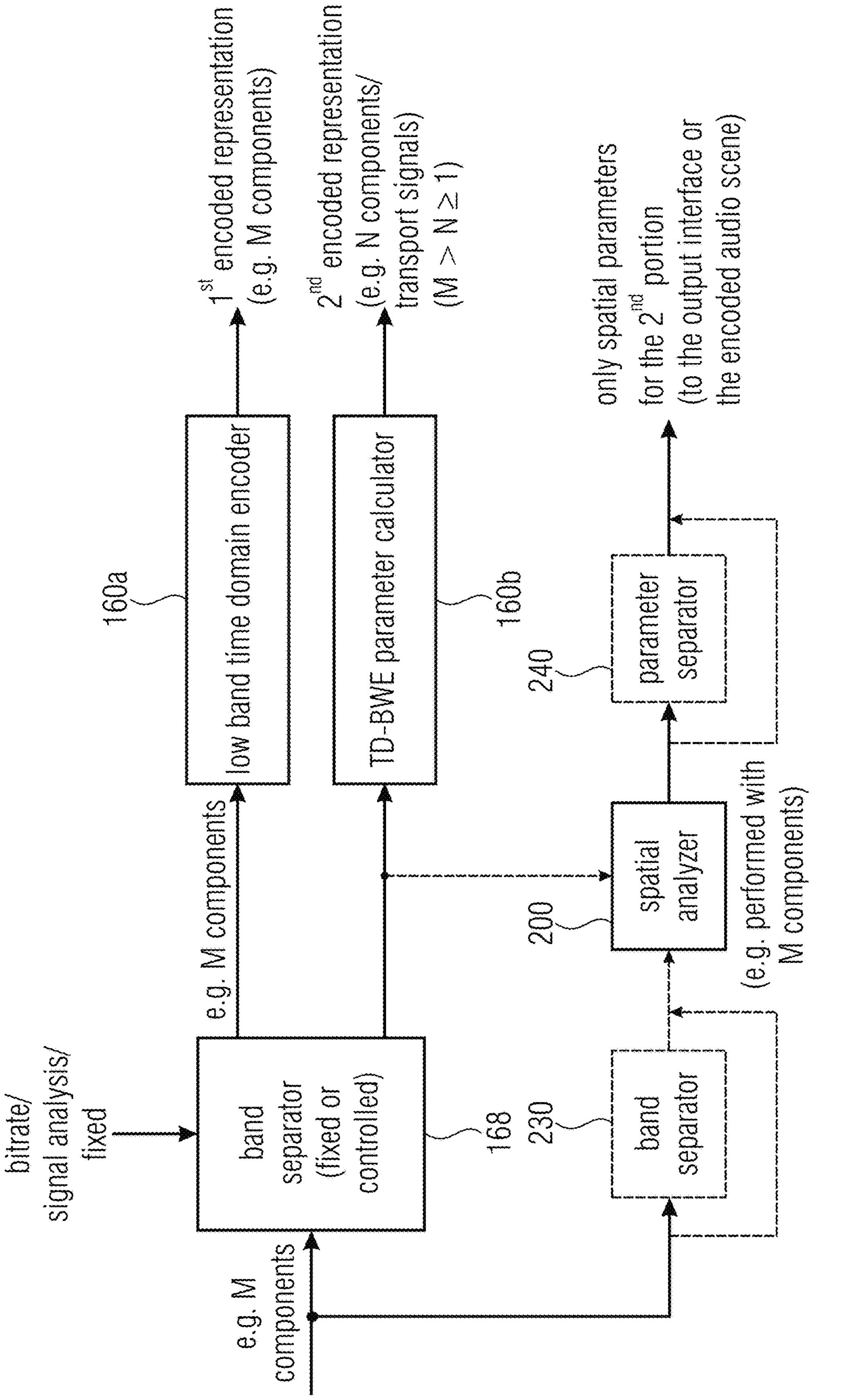
FIG. 9B illustrates a further embodiment of an audio scene encoder with a time domain core encoder.

FIG. 9B illustrates, in contrast to the frequency domain encoder of FIG. 9A, a time domain encoder. Instead of the analysis filter bank 164, a band separator 168 is provided that is either controlled by a mode controller 166 of FIG. 9A (not illustrated in FIG. 9B) or that is fixed. In case of a control, the control can be performed based on a bit rate, a signal analysis, or any other procedure useful for this purposed. The typically M components that are input into the band separator 168 are processed, on the one hand, by a low band time domain encoder 160*a* and, on the other hand, by a time domain bandwidth extension parameter calculator 160*b*. Advantageously, the low band time domain encoder 160*a* outputs the first encoded representation with the M individual components being in an encoded form. Contrary thereto, the second encoded representation generated by the time domain bandwidth extension parameter calculator 160*b* only has N components/transport signals, where the number N is smaller than the number M, and where N is greater than or equal to 1.

Depending on whether the spatial analyzer 200 relies on the band separator 168 of the core encoder, a separate band separator 230 is not required. When, however, the spatial analyzer 200 relies on the band separator 230, then the connection between block 168 and block 200 of FIG. 9B is not necessary. In case none of the band separators 168 or 230 are at the input of the spatial analyzer 200, the spatial analyzer performs a full band analysis and the parameter separator 240 then separates only the spatial parameters for the second portion that are then forwarded to the output interface or the encoded audio scene.

Thus, while FIG. 9A illustrates a wave form preserving encoder processor 160*a* or a spectral encoder for quantizing an entropy coding, the corresponding block 160*a* in FIG. 9B is any time domain encoder such as an EVS encoder, an ACELP encoder, an AMR encoder or a similar encoder. While block 160*b* illustrates a frequency domain parametric encoder or general parametric encoder, the block 160*b* in FIG. 9B is a time domain bandwidth extension parameter calculator that can, basically, calculate the same parameters as block 160 or different parameters as the case may be.

Figure 10A:
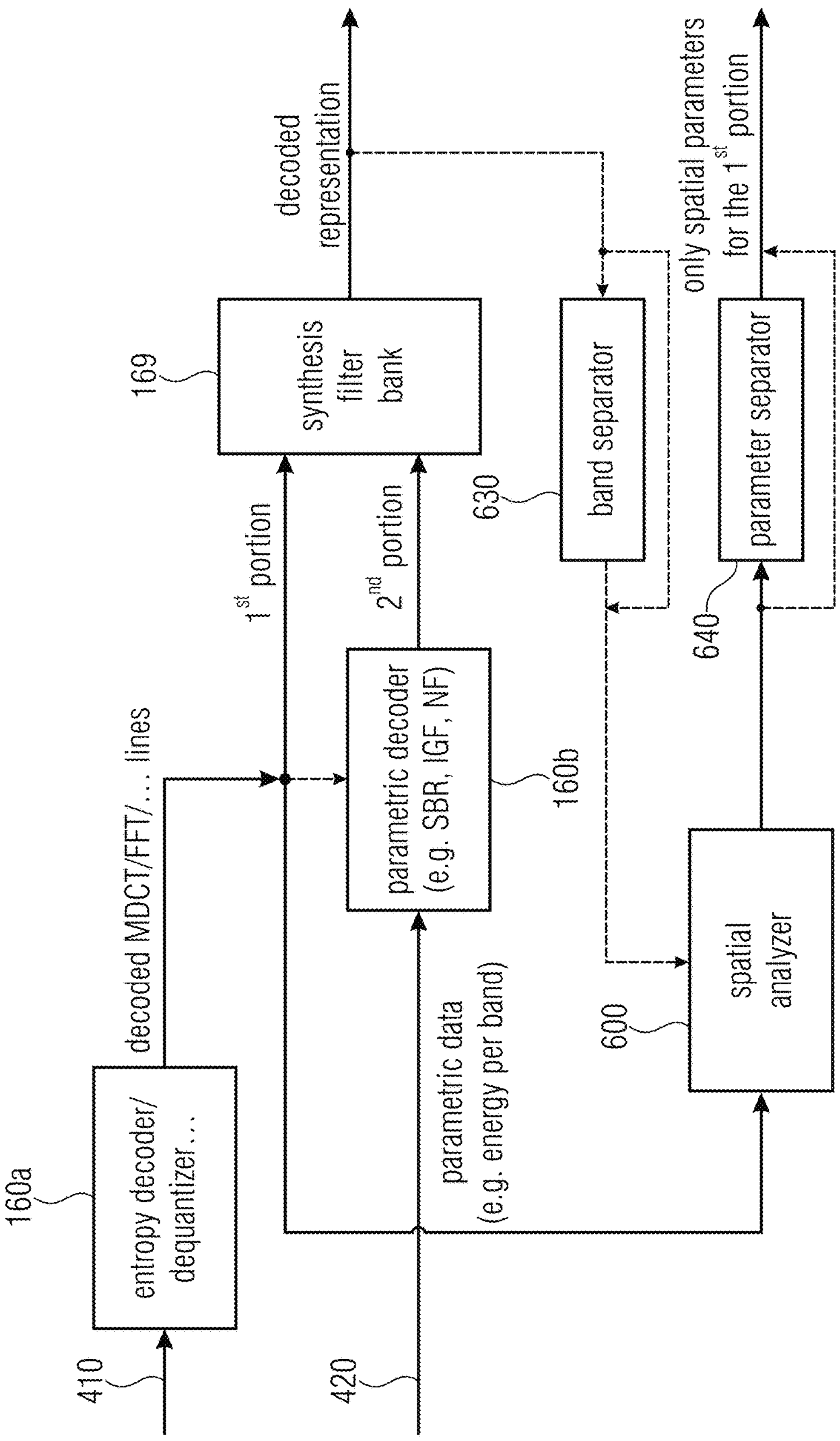
FIG. 10A illustrates a further embodiment of an audio scene decoder with a frequency domain core decoder.

FIG. 10A illustrates a frequency domain decoder typically matching with the frequency domain encoder of FIG. 9A. The spectral decoder receiving the encoded first portion comprises, as illustrated at 160*a*, an entropy decoder, a dequantizer and any other elements that are, for example, known from AAC encoding or any other spectral domain encoding. The parametric decoder 160*b* that receives the parametric data such as energy per band as the second encoded representation for the second portion operates, typically, as an SBR decoder, an IGF decoder, a noise filling decoder or other parametric decoders. Both portions, i.e., the spectral values of the first portion and the spectral values of the second portion are input into a synthesis filter bank 169 in order to have the decoded representation that is, typically forwarded to the spatial renderer for the purpose of spatially rendering the decoded representation.

The first portion can be directly forwarded to the spatial analyzer 600 or the first portion can be derived from the decoded representation at the output of the synthesis filter bank 169 via a band separator 630. Depending on how the situation is, the parameter separator 640 is used or not. In case of the spatial analyzer 600 receiving the first portion only, then the band separator 630 and the parameter separator 640 are not required. In case of the spatial analyzer 600 receiving the decoded representation and the band separator is not there, then the parameter separator 640 is used. In case of the decoded representation is input into the band separator 630, then the spatial analyzer does not need to have the parameter separator 640, since the spatial analyzer 600 then only outputs the spatial parameters for the first portion.

Figure 10B:
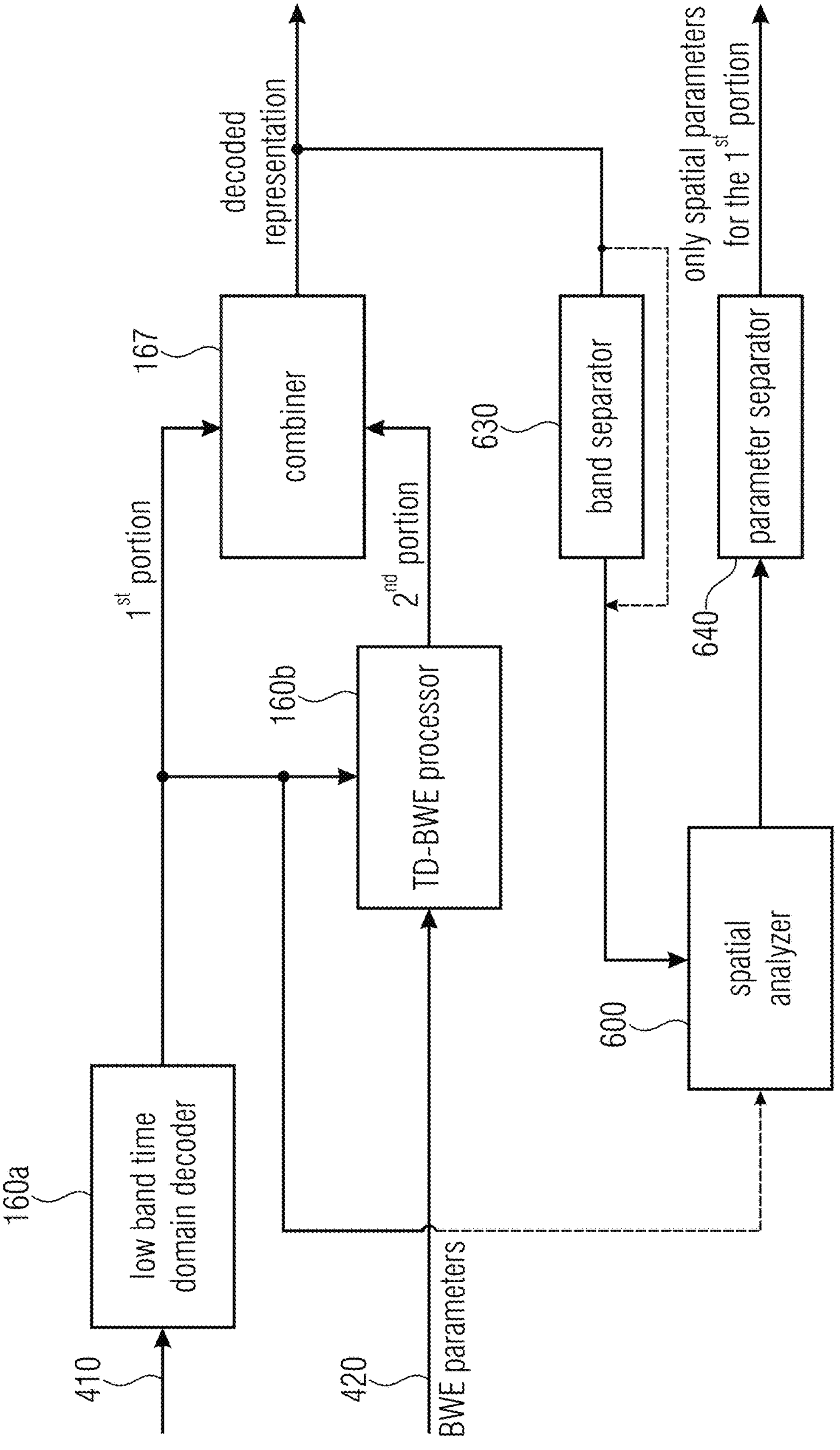
FIG. 10B illustrates a further embodiment of a time domain core decoder.

FIG. 10B illustrates a time domain decoder that is matching with the time domain encoder of FIG. 9B. Particularly, the first encoded representation 410 is input into a low band time domain decoder 160*a* and the decoded first portion is input into a combiner 167. The bandwidth extension parameters 420 are input into a time domain bandwidth extension processor that outputs the second portion. The second portion is also input into the combiner 167. Depending on the implementation, the combiner can be implemented to combine spectral values, when the first and the second portion are spectral values or can combine time domain samples when the first and the second portion are already available as time domain samples. The output of the combiner 167 is the decoded representation that can be processed, similar to what has been discussed before with respect to FIG. 10A, by the spatial analyzer 600 either with or without the band separator 630 or with or without the parameter separator 640 as the case may be.

Figure 11:
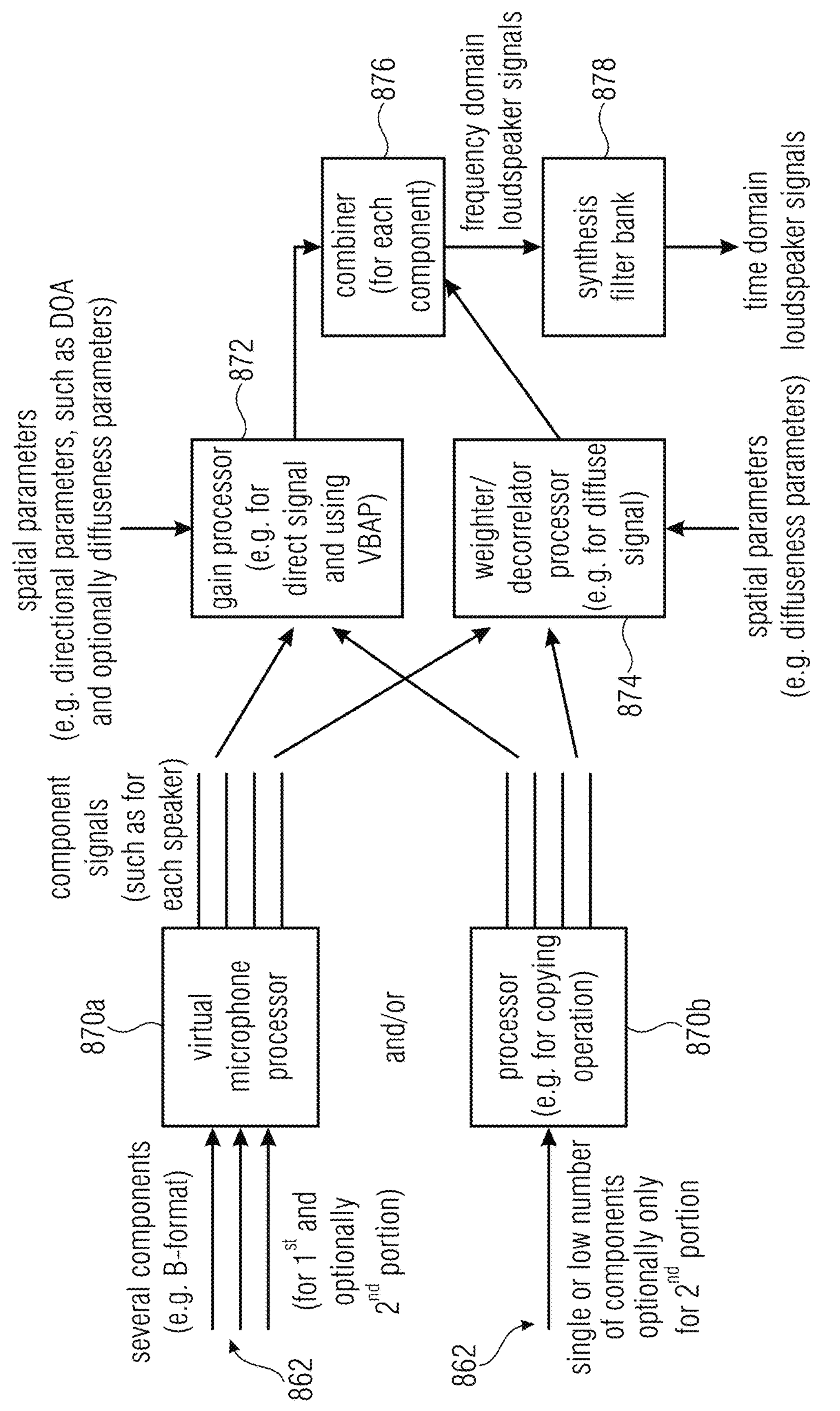
FIG. 11 illustrates an embodiment of a spatial renderer.

FIG. 11 illustrates an implementation of the spatial renderer although other implementations of a spatial rendered that rely on DirAC parameters or on other parameters than DirAC parameters, or produce a different representation of the rendered signal than the direct loudspeaker representation, like a HOA representation, can be applied as well. Typically, the data 862 input into the DirAC synthesizer 800 can consist of several components such as the B-format for the first and the second portion as indicated at the upper left corner of FIG. 11. Alternatively, the second portion is not available in several components but only has a single component. Then, the situation is as illustrated in the lower portion on the left of FIG. 11. Particularly, in the case of having the first and the second portion with all components, i.e., when the signal 862 of FIG. 8B has all components of the B-format, for example, a full spectrum of all components is available and the time-frequency decomposition allows to perform a processing for each individual time/frequency tile. This processing is done by a virtual microphone processor 870*a* for calculating, for each loudspeaker of a loudspeaker setup, a loudspeaker component from the decoded representation.

Alternatively, when the second portion is only available in a single component, then the time/frequency tiles for the first portion are input into the virtual microphone processor 870*a*, while the time/frequency portion for the single or lower number of components second portion is input into the processor 870*b*. The processor 870*b*, for example, only has to perform a copying operation, i.e., to copy the single transport channel into an output signal for each loudspeaker signal. Thus, the virtual microphone processing 870*a* of the first alternative is replaced by a simply copying operation.

Then, the output of blocks 870*a* in the first embodiment or 870*a* for the first portion and 870*b* for the second portion are input into a gain processor 872 for modifying the output component signal using the one or more spatial parameters. The data is also input into a weighter/decorrelator processor 874 for generating a decorrelated output component signal using the one or more spatial parameters. The output of block 872 and the output of block 874 is combined within a combiner 876 operating for each component so that, at the output of block 876 one obtains a frequency domain representation of each loudspeaker signal.

Then, by means of a synthesis filter bank 878, all frequency domain loudspeaker signals can be converted into a time domain representation and the generated time domain loudspeaker signals can be digital-to-analog converted and used to drive corresponding loudspeakers placed at the defined loudspeaker positions.

Typically, the gain processor 872 operates based on spatial parameters and advantageously, directional parameters such as the direction of arrival data and, optionally, based on diffuseness parameters. Additionally, the weighter/decorrelator processor operates based on spatial parameters as well, and, advantageously, based on the diffuseness parameters.

Figure 5B:
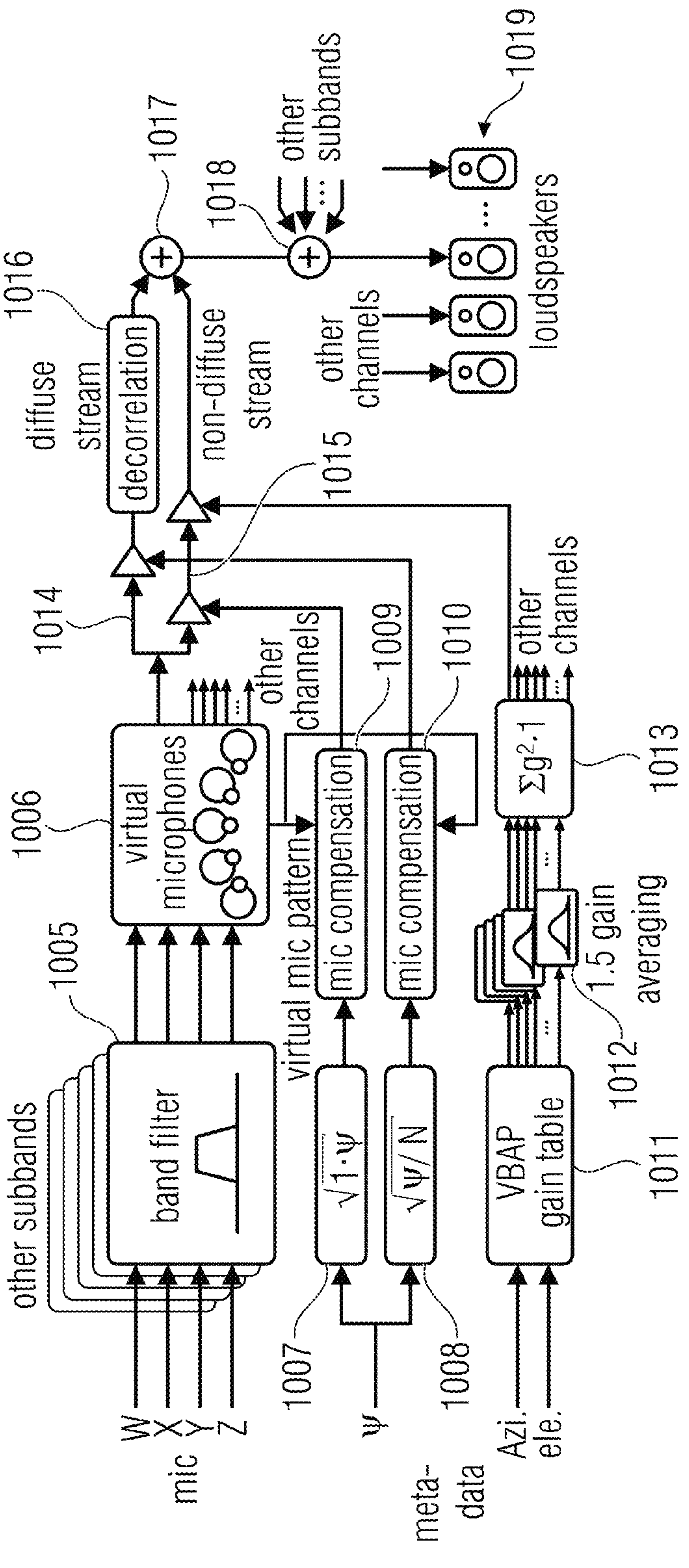
Fig. 5B (PRIOR ART)
FIG. 5B is a known DirAC synthesis stage.

Thus, in an implementation, the gain processor 872 represents the generation of the non-diffuse stream in FIG. 5B illustrated at 1015, and the weighter/decorrelator processor 874 represents the generation of the diffuse stream as indicated by the upper branch 1014 of FIG. 5B, for example. However, other implementations that rely on different procedures, different parameters and different ways for generating direct and diffuse signals can be implemented as well.

Exemplary benefits and advantages of embodiments over the state of the art are:

- Embodiments of the present invention provide a better time-frequency-resolution for the parts of the signal chosen to have decoder-side-estimated spatial parameters over a system using encoder side estimated and coded parameters for the whole signal.
- Embodiments of the present invention provide better spatial parameter values for parts of the signal reconstructed using encoder side analysis of parameters and coding and transmitting said parameters to the decoder over a system where spatial parameters are estimated at the decoder using the decoded lower-dimension audio signal.
- Embodiments of the present invention allow for a more flexible trade-off between time-frequency resolution, transmission rate, and parameter accuracy than either a system using coded parameters for the whole signal or a system using decoder side estimated parameters for the whole signal can provide.
- Embodiments of the present invention provide a better parameter accuracy for signal portions mainly coded using parametric coding tools by choosing encoder side estimation and coding of some or all spatial parameters for those portions and a better time-frequency resolution for signal portions mainly coded using wave-form-preserving coding tools and relying on a decoder side estimation of the spatial parameters for those signal portions.

REFERENCES

[1] V. Pulkki, M-V Laitinen, J Vilkamo, J Ahonen, T Lokki and T Pihlajamäki, "Directional audio coding—perception-based reproduction of spatial sound", International Workshop on the Principles and Application on Spatial Hearing, November 2009, Zao; Miyagi, Japan.

[2] Ville Pulkki. "Virtual source positioning using vector base amplitude panning". J. Audio Eng. Soc., 45 (6): 456 {466, June 1997.

[3] European patent application No. EP17202393.9, "EFFICIENT CODING SCHEMES OF DIRAC METADATA".

[4] European patent application No EP17194816.9 "Apparatus, method and computer program for encoding, decoding, scene processing and other procedures related to DirAC based spatial audio coding".

An inventively encoded audio signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Audio scene encoder for encoding an audio scene, the audio scene comprising at least two component signals, the audio scene encoder comprising:

a core encoder configured for core encoding the at least two component signals, wherein the core encoder is configured to generate a first encoded representation for a first portion of the at least two component signals, and to generate a second encoded representation for a second portion of the at least two component signals;

a spatial analyzer configured for spatially analyzing the audio scene comprising the at least two component signals to derive, in the spatially analyzing, one or more spatial parameters or one or more spatial parameter sets for the second portion of the at least two component signals; and an output interface configured for forming an encoded audio scene signal, the encoded audio scene signal comprising the first encoded representation for the first portion of the at least two component signals, the second encoded representation for the second portion of the at least two component signals, and the one or more spatial parameters or the one or more spatial parameter sets for the second portion of the at least two component signals.

2. Audio scene encoder of claim 1, wherein the audio scene comprises, as a first component signal, an omnidirectional audio signal, and, as a second component signal, at least one directional audio signal.

3. Audio scene encoder of claim 1, wherein the audio scene comprises, as a first component signal, a signal captured by an omnidirectional microphone positioned at a first position, and, as a second component signal, at least one signal captured by an omnidirectional microphone positioned at a second position different from the first position.

4. Audio scene encoder of claim 1, wherein the audio scene comprises, as a first component signal, at least one signal captured by a directional microphone directed to a first direction, and, as a second component signal, at least one signal captured by a directional microphone directed to a second direction, the second direction being different from the first direction.

5. Audio scene encoder of claim 1, wherein the audio scene comprises A-format component signals, B-format component signals, First-Order Ambisonics component signals, Higher-Order Ambisonics component signals, or component signals captured by a microphone array with at least two microphone capsules.

6. Audio scene encoder of claim 1, wherein the audio scene comprises component signals as determined by a virtual microphone calculation from an earlier recorded or synthesized sound scene.

7. Audio scene encoder of claim 1, wherein the first portion of the at least two component signals is a first frequency subband of a time frame and the second portion of the at least two component signals is a second frequency subband of the time frame, and wherein the core encoder is configured to use a predetermined border frequency between the first frequency subband and the second frequency subband.

8. Audio scene encoder of claim 1, wherein the core encoder comprises a dimension reducer for reducing a dimension of the audio scene to obtain a lower dimension audio scene, wherein the core encoder is configured to calculate the first encoded representation for the first portion of the at least two component signals from the lower dimension audio scene, and wherein the spatial analyzer is configured to derive the spatial parameters from the audio scene having a dimension being higher than the dimension of the lower dimension audio scene.

9. Audio scene encoder of claim 1, wherein the core encoder is configured to generate the first encoded representation for the first portion of the at least two component signals comprising M component signals, and to generate the second encoded representation for the second portion of the at least two component signals comprising N component signals, and wherein M is greater than N and N is greater than or equal to 1.

10. Audio scene encoder of claim 1, wherein the first portion of the at least two component signals is a first frequency subband of the at least two component signals, and wherein the second portion of the at least two component signals is a second frequency subband of the at least two component signals, and wherein the spatial analyzer is configured to calculate, for the second frequency subband, as the one or more spatial parameters, at least one of a direction parameter and a non-directional parameter.

11. Audio scene encoder of claim 1, wherein the core encoder comprises:

a time-frequency converter for converting sequences of time frames comprising a time frame of the at least two component signals into sequences of spectral frames for the at least two component signals, a spectral encoder for quantizing and entropy-coding spectral values of a frame of the sequences of spectral frames within a first frequency subband of a spectral frame corresponding to a first frequency subband; and a parametric encoder for parametrically encoding spectral values of the spectral frame within a second frequency subband of the spectral frame corresponding to a second frequency subband.

12. Audio scene encoder of claim 1, wherein the core encoder comprises a time domain or a mixed time domain and frequency domain core encoder for performing a time domain or a mixed time domain and frequency domain encoding operation of a lowband portion of a time frame, the lowband portion corresponding to the first portion of the at least two component signals.

13. Audio scene encoder of claim 1, wherein the spatial analyzer is configured to subdivide the second portion being a second frequency subband into analysis bands, wherein a bandwidth of an analysis band is greater than or equal to a bandwidth associated with two adjacent spectral values processed by the core encoder within the first portion being a first frequency subband, or is lower than a bandwidth of a lowband portion representing the first frequency subband, and wherein the spatial analyzer is configured to calculate at least one of a direction parameter and a diffuseness parameter for each analysis band of the second frequency subband.

14. Audio scene encoder of claim 1, wherein the core encoder and the spatial analyzer are configured to use a common filterbank or different filterbanks having different characteristics.

15. Audio scene encoder of claim 1, wherein the spatial analyzer is configured to subdivide the second portion being a second frequency subband into analysis bands, wherein a bandwidth of an analysis band is greater than or equal to a bandwidth associated with two adjacent spectral values processed by the core encoder within the first portion being a first frequency subband, or is lower than a bandwidth of a lowband portion representing the first frequency subband, wherein the spatial analyzer is configured to calculate a direction parameter and a diffuseness parameter for each analysis band of the second frequency subband, and wherein the spatial analyzer is configured to use, in the calculation of the direction parameter, an analysis band being smaller than an analysis band used in the calculation of the diffuseness parameter.

16. Audio scene encoder of claim 1, wherein the core encoder comprises a multi-channel encoder for generating an encoded multi-channel signal for the at least two component signals.

17. Audio scene encoder of claim 1, wherein the core encoder comprises a multi-channel encoder for generating two or more encoded multi-channel signals, when a number of component signals of the at least two component signals is three or more.

18. Audio scene encoder of claim 1, wherein the core encoder is configured to generate the first encoded representation with a first resolution and to generate the second encoded representation with a second resolution, wherein the second resolution is lower than the first resolution.

19. Audio scene encoder of claim 1, wherein the core encoder is configured to generate the first encoded representation with a first time or first frequency resolution and to generate the second encoded representation with a second time or second frequency resolution, the second time or frequency resolution being lower than the first time or frequency resolution.

20. Audio scene encoder of claim 1, wherein the output interface is configured for not including any spatial parameters for the first portion of the at least two component signals or a first frequency subband into the encoded audio scene signal, or for including a smaller number of spatial parameters for the first frequency subband into the encoded audio scene signal compared to a number of the spatial parameters for a second frequency subband.

21. Method of encoding an audio scene, the audio scene comprising at least two component signals, the method comprising:

core encoding the at least two component signals, wherein the core encoding comprises generating a first encoded representation for a first portion of the at least two component signals, and generating a second encoded representation for a second portion of the at least two component signals;

spatially analyzing the audio scene comprising the at least two component signals to derive, in the spatially analyzing, one or more spatial parameters or one or more spatial parameter sets for the second portion of the at least two component signals; and forming an encoded audio scene signal, the encoded audio scene signal comprising the first encoded representation, the second encoded representation, and the one or more spatial parameters or the one or more spatial parameter sets for the second portion of the at least two component signals.

22. Non-transitory storage medium, having stored thereon a computer program for performing, when running on a computer or a processor, the method of claim 21.

* * * * *